US012285973B2

(12) United States Patent
Tully et al.

(10) Patent No.: US 12,285,973 B2
(45) Date of Patent: Apr. 29, 2025

(54) BASSINET

(71) Applicant: The University of North Carolina at Chapel Hill, Chapel Hill, NC (US)

(72) Inventors: Kristin Patricia Tully, Hillsborough, NC (US); Catherine Sullivan, Chapel Hill, NC (US); Carl John Seashore, Chapel Hill, NC (US); Alison Mann Stuebe, Chapel Hill, NC (US); Ty Hagler, Chapel Hill, NC (US); Patrick Murphy, Chapel Hill, NC (US); Prasad Joshi, Chapel Hill, NC (US); Charity Grace Kirk, Chapel Hill, NC (US)

(73) Assignee: THE UNIVERSITY OF NORTH CAROLINA AT CHAPEL HILL, Chapel Hill, NC (US)

( * ) Notice: Subject to any disclaimer, the term of this patent is extended or adjusted under 35 U.S.C. 154(b) by 0 days.

(21) Appl. No.: 18/372,381

(22) Filed: Sep. 25, 2023

(65) Prior Publication Data
US 2024/0092121 A1 Mar. 21, 2024

Related U.S. Application Data

(63) Continuation of application No. 17/410,529, filed on Aug. 24, 2021, now Pat. No. 11,794,519, which is a
(Continued)

(51) Int. Cl.
*B60B 33/00* (2006.01)
*A47D 7/01* (2006.01)
*A47D 9/00* (2006.01)

(52) U.S. Cl.
CPC ................ *B60B 33/00* (2013.01); *A47D 7/01* (2013.01); *A47D 9/00* (2013.01); *A47D 9/012* (2022.08); *A47D 9/016* (2022.08)

(58) Field of Classification Search
CPC . A47D 9/00; A47D 7/01; A47D 9/016; B60B 33/026; B60B 33/028; A61G 11/00
See application file for complete search history.

(56) References Cited

U.S. PATENT DOCUMENTS 6,964,071 B1   11/2005   Lahmann
8,429,771 B2    4/2013   Long
(Continued)

FOREIGN PATENT DOCUMENTS

CN    1111148454 A    5/2020
EP       3170488 A1    5/2017
(Continued)

OTHER PUBLICATIONS

International Search Report and Written Opinion for Application No. PCT/US2018/050906 dated Jan. 14, 2019.
(Continued)

*Primary Examiner* — Adam C Ortiz
(74) *Attorney, Agent, or Firm* — KDW FIRM PLLC

(57) ABSTRACT

A bassinet includes a base, a column assembly rotatably connected to the base at a first end of the column assembly, an arm rotatably connected to a second end of the column assembly, a tub frame pivotably connected to the arm, an infant tub retained within the tub frame, the infant tub including a front wall, a back wall, and two side walls and having areas of reduced height along the front wall and at least one of the side walls to provide enhanced access to the infant located within the infant tub, and an insert configured to reversibly fit within an interior of the infant tub.

9 Claims, 37 Drawing Sheets

Related U.S. Application Data continuation of application No. 16/809,734, filed on Mar. 5, 2020, now Pat. No. 11,116,330, which is a continuation of application No. PCT/US2018/050906, filed on Sep. 13, 2018.

(60) Provisional application No. 62/558,535, filed on Sep. 14, 2017.

(56) References Cited

U.S. PATENT DOCUMENTS

| | | |
|---|---|---|
| D786,577 S | 5/2017 | Czach |
| 9,962,012 B1 | 5/2018 | Schmid |
| D819,358 S | 6/2018 | Czach |
| 10,149,551 B2 | 12/2018 | Long |
| 11,116,330 B2 | 9/2021 | Tully |
| 2003/0112147 A1 | 6/2003 | George |
| 2003/0126681 A1 | 7/2003 | Tharalson |
| 2008/0052821 A1 | 3/2008 | Morton |
| 2008/0141457 A1 | 6/2008 | Forshpan |
| 2010/0162482 A1 | 7/2010 | Cohen |
| 2010/0199426 A1 | 8/2010 | Long |
| 2012/0017369 A1 | 1/2012 | Li |
| 2014/0033432 A1 | 2/2014 | Marle |
| 2014/0300476 A1* | 10/2014 | Sabota .................... G08B 3/10 340/573.1 |
| 2014/0310870 A1 | 10/2014 | Czach |
| 2016/0135610 A1 | 5/2016 | Long |
| 2017/0000672 A1 | 1/2017 | Andersson |
| 2017/0136382 A1 | 5/2017 | Smokowski |
| 2017/0172312 A1 | 6/2017 | Mohr |
| 2017/0196373 A1 | 7/2017 | Sclare |
| 2020/0268168 A1 | 8/2020 | Tully |
| 2022/0095812 A1 | 3/2022 | Tully et al. |

FOREIGN PATENT DOCUMENTS

| | | |
|---|---|---|
| EP | 3675692 A1 | 7/2020 |
| GB | 2421684 A | 7/2006 |
| JP | 2015192765 A | 11/2015 |
| JP | 2020534048 A | 11/2020 |
| KR | 1020120125584 A1 | 11/2012 |
| WO | 201407844 A1 | 5/2014 |
| WO | 2017053406 A1 | 3/2017 |
| WO | 2019055671 A1 | 3/2019 |

OTHER PUBLICATIONS

Tully et al, "Postnatal Unit Bassinet Types When Rooming—In After Cesarean Birth: Implications for Breastfeeding and Infant Safety," Journal of Human Lactation, vol. 28, No. 4, pp. 495-505 (Nov. 2012).

Tully et al, Maternal Accounts of Their Breastfeeding Intent and Early Challenges After Cesarean Childbirth, Midwifery, vol. 30, No. 6, pp. 712-719 (Jun. 2014).

World Health Organization, "Ten Steps to Successful Breastfeeding and Infant Safety," Unicef Report, (2018).

Extended European Search Report for Application No. 18856709 dated Mar. 30, 2021.

Japanese Notice of Reasons for Refusal for Application No. 2020512838 dated Oct. 11, 2022.

Brazilian Office Action for Application No. 112020005002 dated Sep. 7, 2022.

Chinese Office Action for Application No. 201880059708 dated Feb. 25, 2023.

\* cited by examiner

BASSINET

CROSS-REFERENCE TO RELATED APPLICATION

This application is a continuation of and claims priority to U.S. patent application Ser. No. 17/410,529 filed Aug. 24, 2021, which is a continuation of U.S. patent application Ser. No. 16/809,734 filed Mar. 5, 2020, which is a continuation of and claims priority to PCT/US2018/050906 filed Sep. 13, 2018, which claims the benefit of and priority to U.S. Provisional Patent Application Ser. No. 62/558,535 filed Sep. 14, 2017, the disclosures of which are incorporated herein by reference in their entireties.

TECHNICAL FIELD

The subject matter disclosed herein relates generally to the field of postnatal maternal and infant health care devices and system, in particular to medical bassinets for use in postnatal units within hospitals, birthing centers, and/or other healthcare facilities.

BACKGROUND

Until recently, the standard of hospital care for healthy term newborns was to be observed and cared for by maternity staff in a nursery with other infants, an environment that is physically separated from the birth mother. The World Health Organization/UNICEF report Ten Steps for Successful Breastfeeding (1989; 2009; 2018), however, established a set of global evidence-based best practices to promote optimal health outcomes for both the infant(s) and the birth mother. These guidelines were subsequently recommended in 2011 by the U.S. Surgeon General to be implemented for all U.S. maternity facilities. Further, Ten Steps implementation is a Healthy People 2020 objective (MICH 24). Step seven of the Ten Steps focuses on mothers and babies "rooming-in" together 24 hours per day (i.e., substantially continuously), with one hour of separation allocated as being allowable for procedures on the infant or birth mother outside of the postnatal unit room.

As a result, the practice of common nursery care is no longer recommended nor facilitated. However, the vast majority of bassinets in US hospitals are still designed for use by ambulatory nursery staff, rather than for use by new mothers, whose mobility is limited by recovering from birth. As such, currently utilized postnatal unit bassinets are designed in a manner that is inconsistent with maternal-infant health needs. Specifically, two example instances where current bassinet designs restrict maternal access to infants and expose the infant to physical injury are (1) that the infant sleeping tub tips under the weight of the arms of a mother as she reaches into the bassinet tub from the bed, and (2) that the height of the walls of the infant sleeping tubs compromises infant access and secure handling.

Designs for currently available bassinets are especially deficient for mothers who deliver by cesarean section, as their mobility restrictions and pain after delivery of the infant hinder infant care, impede their own recovery, and contribute significantly to the risk of infant falls. Cesarean section births currently account for 1.3 million births in the US annually. By requiring new mothers to either substantially twist their bodies in the immediate postpartum period to access their infants in the bassinet or to get out of bed to reach their infants, existing postnatal unit bassinet designs expose new mothers to unnecessary frustration, pain, and/or injury. Impeded maternal access to their infants during hospitalization also undermines breastfeeding, which is critical to both maternal and child health and requires recognition of infant cues and the ability to put infants to the breast frequently. In fact, when using conventionally designed postnatal bassinets, mothers report postnatal unit breastfeeding obstacles as being intertwined with the difficulty presented with using such conventional bassinets, with nighttime being the most challenging period due to maternal pain, fatigue, and the difficulty experienced during each infant handling encounter. In some instances, mothers have reported feeling limited in their ability to put their newborns to the breast because of their relentless pain that increases during such movements.

Existing bassinet designs also present a health equity issue—in the absence of attentive family members willing and able to provide 24-hour assistance, new mothers often call upon nurses for non-medical needs such as infant diaper changes. Women who are feeling vulnerable after childbirth, however, whether as a result of being, for example, from a lower socioeconomic background or due to existing language barriers, may not request the care they need. When new mothers call for medical personnel (i.e., nursing staff) due to their inherent mobility restrictions, nurses may be delayed in responding to the medical needs of, or otherwise cut short medical care to, others. Current constraints place practical burdens and emotional strain on healthcare staff. In fact, the American Academy of Pediatrics (AAP) has recently advocated for new bassinet technology.

The iatrogenic obstacles presented by existing bassinet designs contribute to infants being placed in the maternity bed or on chairs while the new mother is asleep, instead of being placed back into the bassinet. This coping strategy while rooming-in contributes to infant falls and suffocation, contributing to increased mortality rates, although the degree of the increase is not specifically known due to a historical lack of mandatory reporting of such events.

In 2009, only 2.9% of US hospitals had earned the WHO/UNICEF "Baby-Friendly" designation. This global standard of healthcare has rapidly expanded to the point where all 50 states now contain at least one facility with the "Baby-Friendly" designation. By 2018, over 26% of all US hospitals and birthing centers have the "Baby-Friendly" designation. The significant uptake of these evidence-based practices has been supported by Federal investment in initiatives that assist hospital facilities on their Baby-Friendly journey.

As such, a need currently exists to provide enhanced visual and physical access to infants by new mothers who are "rooming-in" with their infants in order to reduce the risk for tragic adverse events, such as falls or suffocation, by providing a secure and accessible sleeping location for the infant. Moreover, there is an unmet need in relation to patient (maternal) access to convenient and safe bassinet use as typically a bassinet is positioned and adjusted at the bedside by someone standing next to the bed and not by the mother from a seated position in bed.

SUMMARY

In some aspects, a bassinet is provided comprising a base, a column assembly rotatably connected to the base at a first end of the column assembly, an arm rotatably connected to a second end of the column assembly, a tub frame pivotably connected to the arm, an infant tub retained within the tub frame, the infant tub comprising a front wall, a back wall, and two side walls and having areas of reduced height along the front wall and at least one of the side walls to provide enhanced access to the infant located within the infant tub, and an insert configured to reversibly fit within an interior of the infant tub, wherein, in a first position, all or some of the insert can block the areas of reduced height. In some aspects, an upper edge of the infant tub and at least some or all of the insert can be substantially continuous and a uniform height around a perimeter of the infant tub, and wherein, in a second position, the insert does not block the areas of reduced height and can be positioned adjacent to the back wall and at least portions of the two side walls of the infant tub. The insert is maintained in position, at least in part, by being held between the lateral edges of a mattress located within the infant tub and one or more corresponding walls (e.g., front, side, or rear walls) of the infant tub. In some embodiments, the insert can be moved between the access position and the secure position while the mattress remains substantially stationary within the infant tub, without the need to move an infant resting thereon.

BRIEF DESCRIPTION OF THE DRAWINGS

A full and enabling disclosure of the present subject matter is set forth more in the remainder of the specification, including reference to the accompanying, example figures, in which.

DETAILED DESCRIPTION

An example embodiment for a bassinet suitable for use in a hospital, birthing center or other maternity healthcare setting is illustrated in the figures, which will be described further hereinbelow in a non-limiting manner. In the embodiments shown, the bassinet comprises a base, a column assembly connected to the base, an arm connected to the column assembly, a tub frame connected to the arm, and an infant tub that is removably contained within the tub frame. In some embodiments, the height of the arm, the tub frame, and the infant tub is variable and manually selectable by a user, from a standing or seated position for example, over a predefined range of heights relative to the base and the surface on which the mobile bassinet is supported (e.g., the floor). In some embodiments, the arm is a rotary arm that is configured to rotate through a predefined range of rotary movements relative to the base of the mobile bassinet. In some embodiments, the tub frame is configured to rotate relative to the arm. In some embodiments, the base may be absent and replaced with another structure, such as any suitable non-movable structure for example, that provides complete support for the bassinet, such as, for example, a hospital bed in a postnatal unit room in a hospital or other birthing center, such that the bassinet is no longer independently mobile from the supporting structure, but is rotatable relative thereto. These features are capable of being combined in any combination without deviating from the scope of the subject matter disclosed herein.

Figure 1:
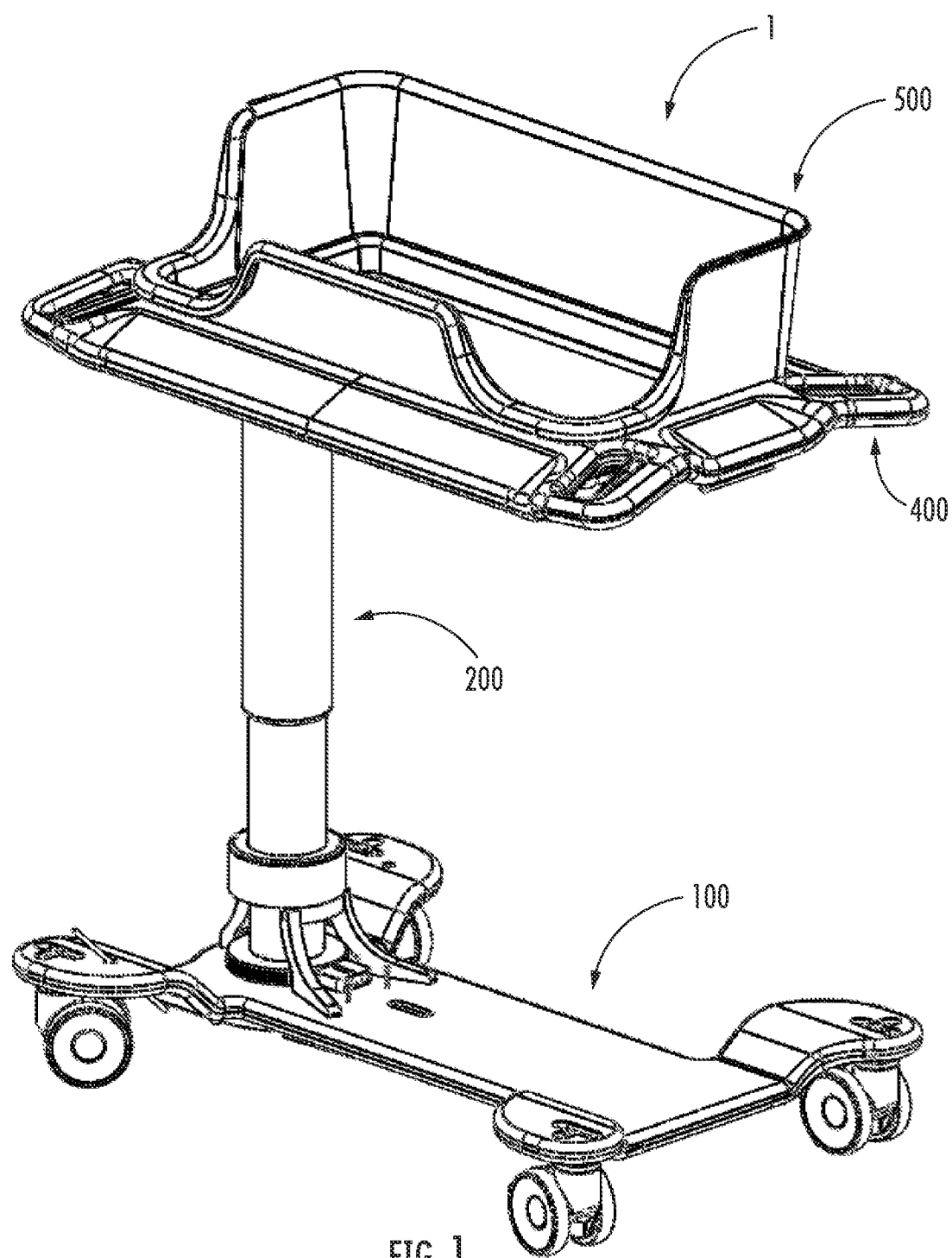
FIG. 1 is an isometric view of an example embodiment of a bassinet suitable for use in hospitals for example, in accordance with the disclosure herein.
Figure 2:
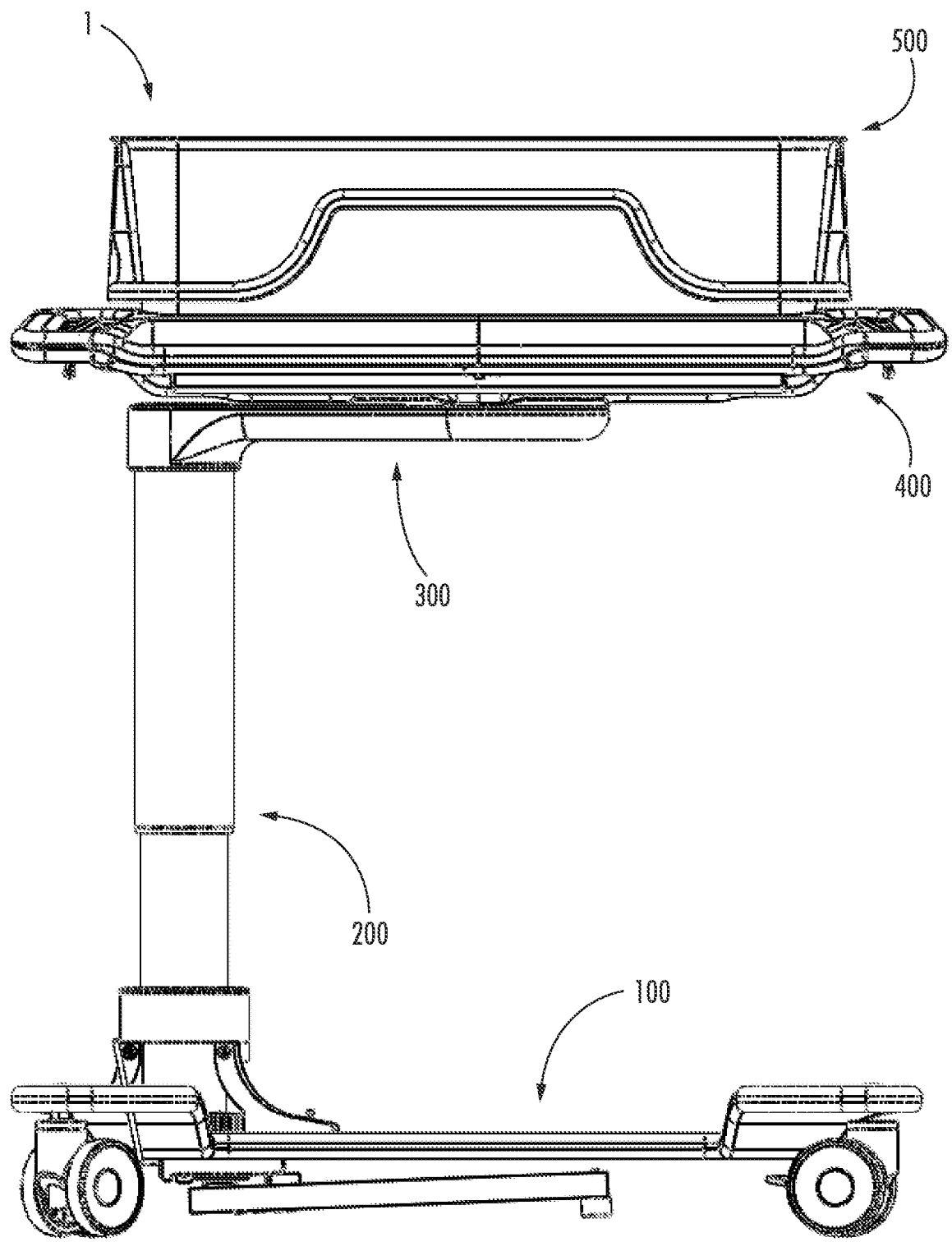
FIG. 2 is a side view of the bassinet shown in FIG. 1, in accordance with the disclosure herein.

In FIGS. 1 and 2, an example embodiment of a mobile bassinet, generally designated 1, is shown. Bassinet 1 has a base, generally designated 100, a column assembly, generally designated 200, attached to the base 100, an arm, generally designated 300, rotatably connected to the column assembly 200, a tub frame, generally designated 400, rotatably connected to the arm, and an infant tub, generally designated 500, that is removably contained within a recessed portion of the tub frame 400. As shown, the tub frame has, for example, three rotational degrees of freedom from a stationary object (e.g., a hospital bed) about which the bassinet 1 is movably positioned. The first rotational degree of freedom is achieved by the base 100 being rotatable and/or pivotable relative to the stationary object using, for example casters (see, e.g., 130 in FIG. 3). The second rotational degree of freedom is achieved by the column assembly 200, as well as the arm 300, tub frame 400, and infant tub 500, being rotatable and/or pivotable about the base 100. The third rotational degree of freedom is achieved by the tub frame 400, as well as the infant tub 500, being rotatable and/or pivotable about the arm 300. At least some of the components of the bassinet 1 are capable of being secured and/or locked, at least temporarily, in any respective position achieved due to the three rotational degrees of freedom. Due to these three rotational degrees of freedom, the infant tub is capable of being moved into virtually any user-selectable position relative to the stationary object. In FIG. 2, the bassinet 1 is shown in a position and configuration that could be used for either transport of an infant within the infant tub 500 or for inactive periods of time (e.g., when the infant is sleeping).

Figure 3:
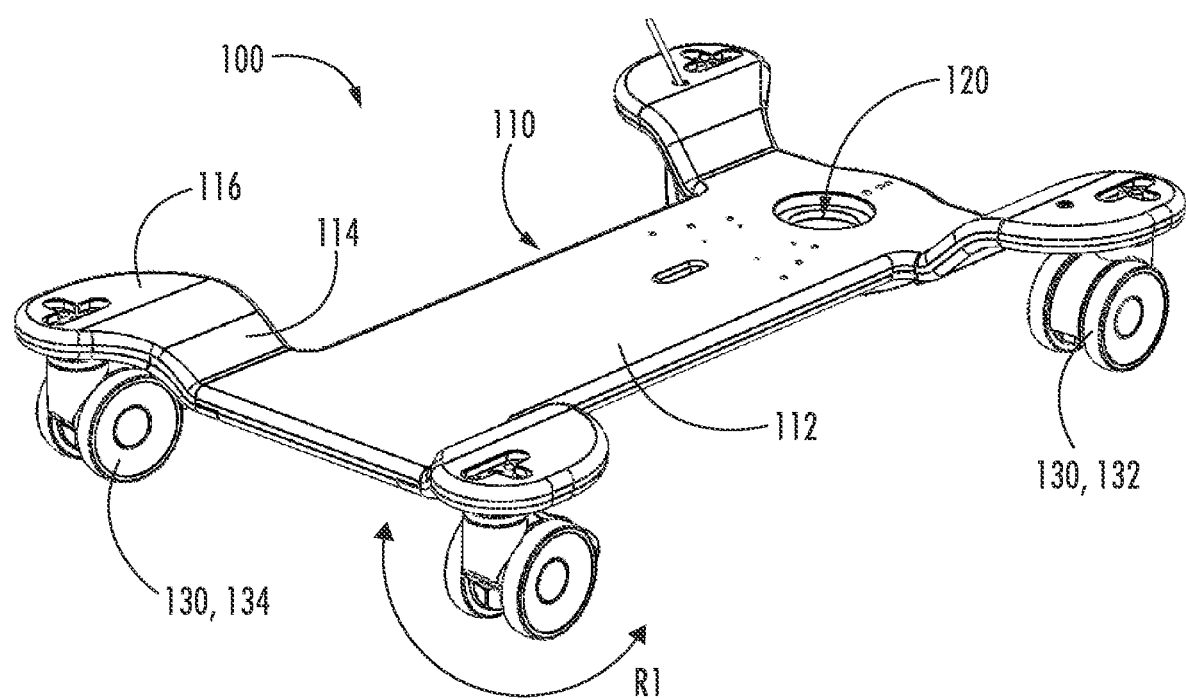
FIG. 3 is an isometric view of the base of the bassinet shown in FIG. 1, in accordance with the disclosure herein.

FIG. 3 shows an isometric view of the base 100 isolated from the other components of bassinet 1. Base 100 comprises a main body, generally designated 110, which comprises a base plate 112 and a wheel mount area 116 attached at each corner thereof, with the wheel mount areas 116 being connected to the base plate 112 by a transition region 114. The use of the transition regions 114 allows for the base 100 to have a lower center of mass by having the base plate 112 lower than the height of the wheel mount areas 116, which is generally determined by the physical dimensions of the wheels 130 selected for a given application. By way of example, it may be advantageous to use caster or other wheels 130 that are pneumatic for bassinets that will be used to transport infants over any typical surfaces (e.g., paved surfaces), while harder wheels 130, e.g., those made from plastic or solid rubber, may be selected for bassinets that will only be used on smooth surfaces, such as those found within a typical U.S. hospital. In general, pneumatic wheels will have a larger diameter than will hard plastic or rubber caster wheels, such that the height difference between the wheel mount area 116 and the base plate 112 may be selected based on the type of wheel 130 that will be installed on the base 100 of the bassinet. Base 100 can include manual or front wheels 134 which can be manually lockable (e.g., by foot actuation of a locking lever) and are rotatable in direction R1 about an axis. Base 100 also has rear wheels 132 which can have an automatic locking function, such that they will only rotate when the automatic lock is released by a user and will automatically lock when the user disengages the automatic lock release or the base can instead be otherwise secured without automatic locking into a stationary position with any suitable structure. Also, it is possible for base 100 to not have any locking function. Rear wheels 132 can be pivoting, as shown by R1 for front wheels 134, or can be rotationally fixed. In the embodiment shown, all caster wheels 130 are rotatable in the direction R1 about an axis defined by the attachment location of each caster wheel 130 to the base 100. Each wheel 130 can be individually locked in a stationary position, for example angularly or rotationally, to prevent movement thereof while the bassinet is in motion. Each wheel 130 can also include a shroud or other cover if desired. Base 100 has a hole 120 therein for attachment of the column assembly 200 to the base 100.

Figure 4:
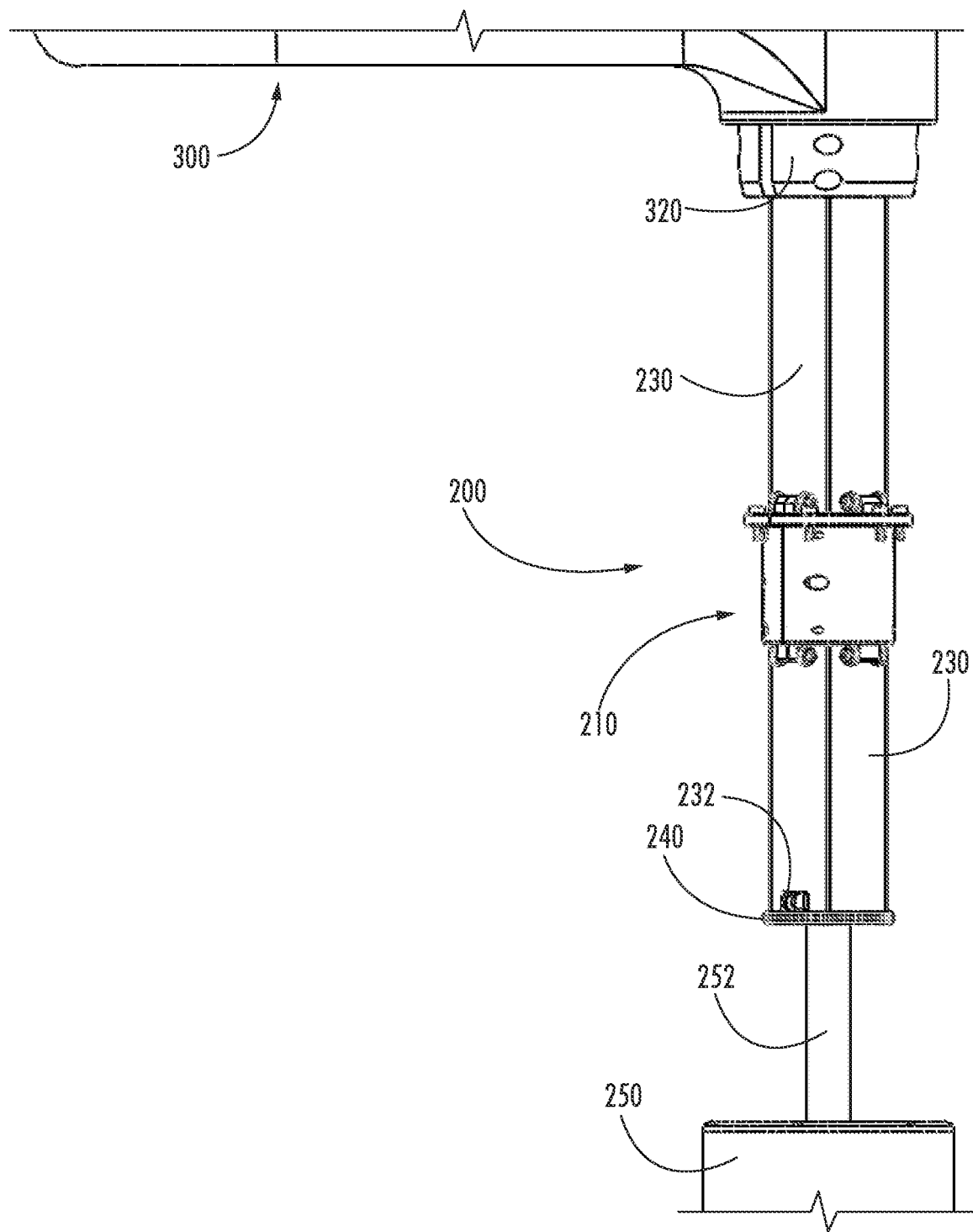
FIG. 4 is a side view of an internal portion of the column assembly of the bassinet shown in FIG. 1, in accordance with the disclosure herein.
Figure 5:
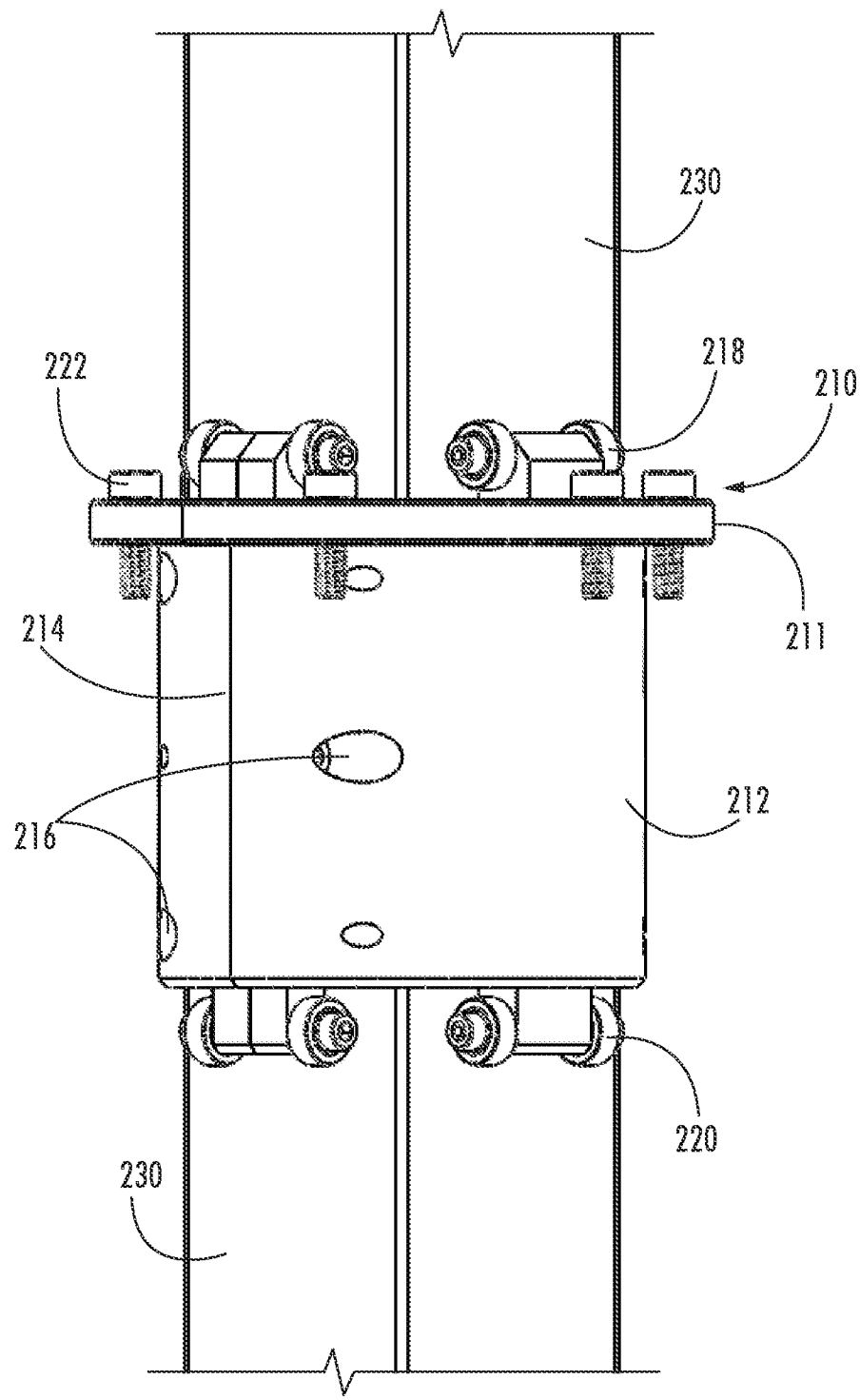
FIG. 5 is a view of an internal portion of the column assembly shown in FIG. 4, showing a linear bearing interfacing with a support post of the bassinet, in accordance with the disclosure herein.
Figure 6:
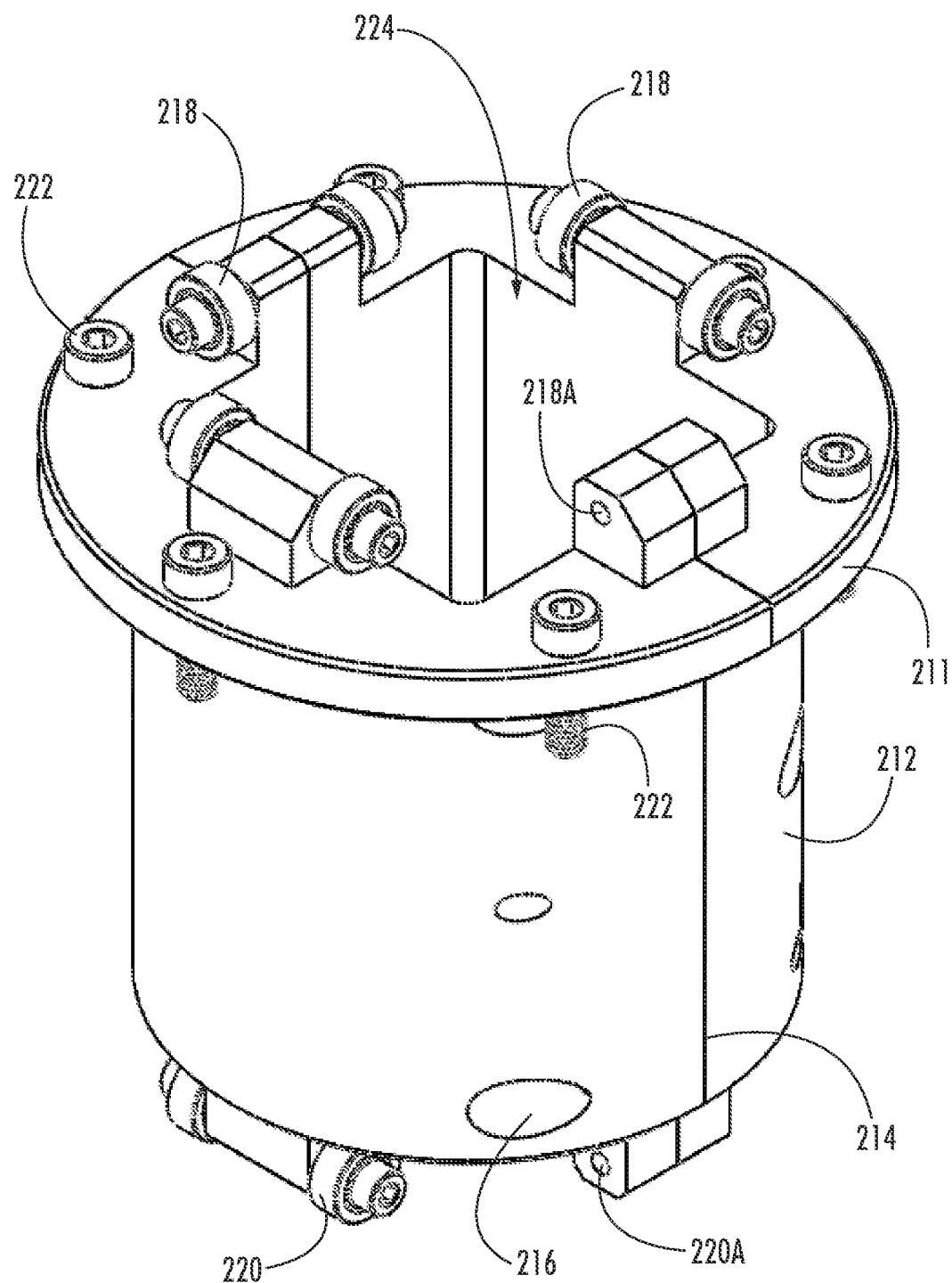
FIG. 6 is an isometric view of the linear bearing shown in FIGS. 4 and 5, in accordance with the disclosure herein.

In FIG. 4, an internal view of column assembly 200 is shown, with external structural/cladding members being omitted to clearly illustrate the internal structures therein. Column support 250 is attached to the base 100 (see FIG. 3) of the bassinet and is fixed thereto such that the column support 250 is held stationary with respect to base 100. A height adjuster 252 is attached to the base 100 at a first end thereof and to a support post 230 at a second end thereof. The height adjuster 252 allows for arm 300 to be set at one of a plurality of heights relative to base 100 within a predefined range of height values. The support post 230 is connected at its first end to the arm 300 by arm collar 320, which is securely clamped about the support post 230 to prevent relative angular rotations between the arm 300 and the support post 230. The support post 230 passes through a linear bearing, generally designated 210. The linear bearing is configured to prevent relative rotational movements between the support post 230, which has a square cross-section and a circular lower support member 236 (see FIG. 10). The support post 230 has a support post positioner generally designated 240 attached at the second end thereof. The support post positioner 240 has a cross-sectional shape that is contoured to the inner surface of the lower support member 236. Because the support post 230 is connected to the lower support member 236 at two positions, unwanted movements (e.g., "wobbling") of the infant tub are minimized. The support post 230 is moved vertically by an actuation of the height adjuster, which can be a pneumatic cylinder in some embodiments.

The linear bearing 210 is shown in greater detail in FIGS. 5-8. The linear bearing 210 has a housing 212 that can be formed as a single piece with a single housing seam 214 or as two separate pieces that are attached (e.g., hinged together in a clam shell arrangement or as separate pieces that are not connected to each other prior to installation) around the support post 230, so as to define two housing seams 214. The housing 212 has an upper flange 211 with a shape that is substantially similar (e.g., a same, similar, or larger diameter) to the lower support member 236 (see FIG. 10). The housing 212 is connected to the lower support member 236 by fasteners 222 (e.g., threaded screws) passing through holes 222A passing through the flange 211. At least one (e.g., a plurality of) upper roller 218 extends upwards from the housing 212 and is arranged on each of the lateral sides of the support post 230. At least one (e.g., a plurality of) lower roller 220 extends downwards from the housing 212 and is arranged on each of the lateral sides of the support post 230. Upper and lower rollers 218 and 220, respectively, are attached to the housing 212 at support members 218A and 220A, respectively, which have through-holes formed therethrough. Upper and lower rollers 218 and 220, respectively, can be made of a material having a suitable durometer so as to be at least partially compressed against the surface of the support post 230 to ensure positive pressure in the attachment of the linear bearing 210 about the support post 230. Linear bearing 210 is secured about the support post 230 by one or more clamping fasteners 216, which can be of the threaded screw type. The linear bearing 210 is configured such that the support post 230 is vertically mobile through and relative to the linear bearing 210. A cavity 224 is formed through the thickness (e.g., in the vertical direction) of the linear bearing 210. The cavity 224 has a cross-sectional shape and contour that is at least as large as the cross-sectional shape of the support post 230, but preferably has a larger cross-sectional area than the support post 230.

Figure 7:
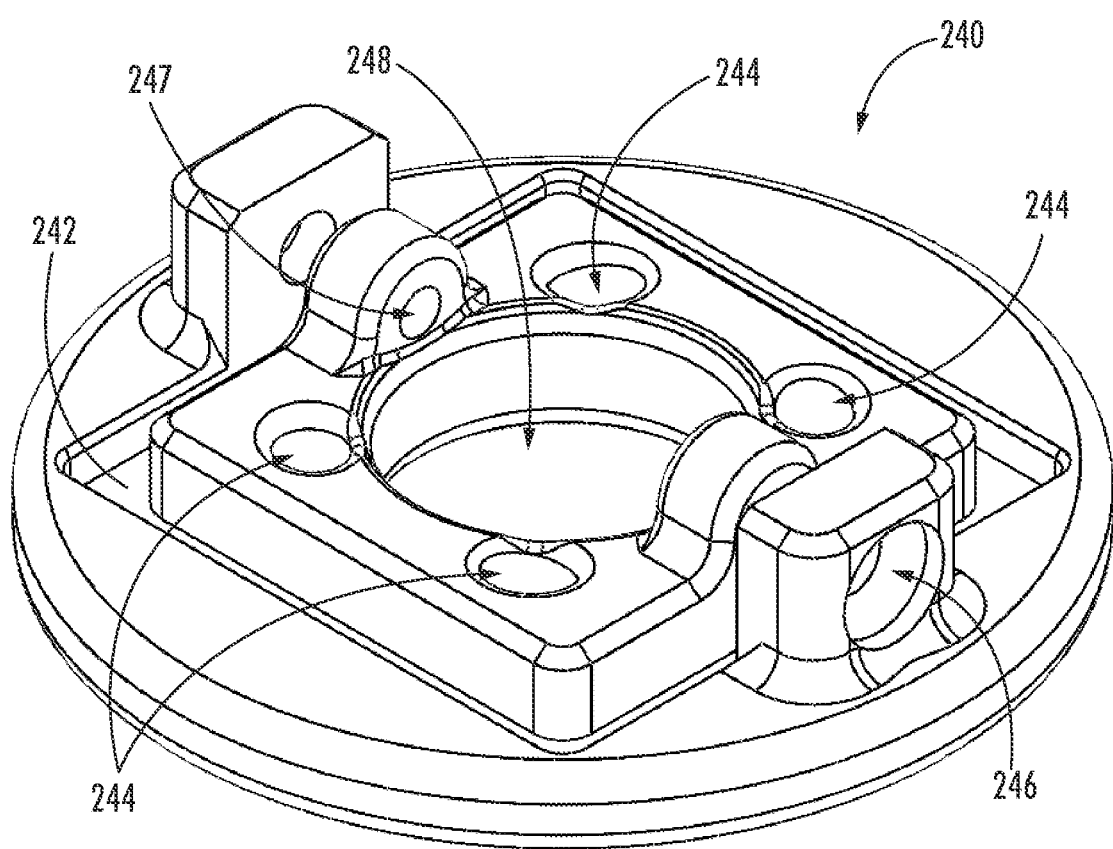
FIG. 7 is an isometric view of a portion of the column assembly, specifically a support post positioner, shown in FIG. 4, in accordance with the disclosure herein.
Figure 8:
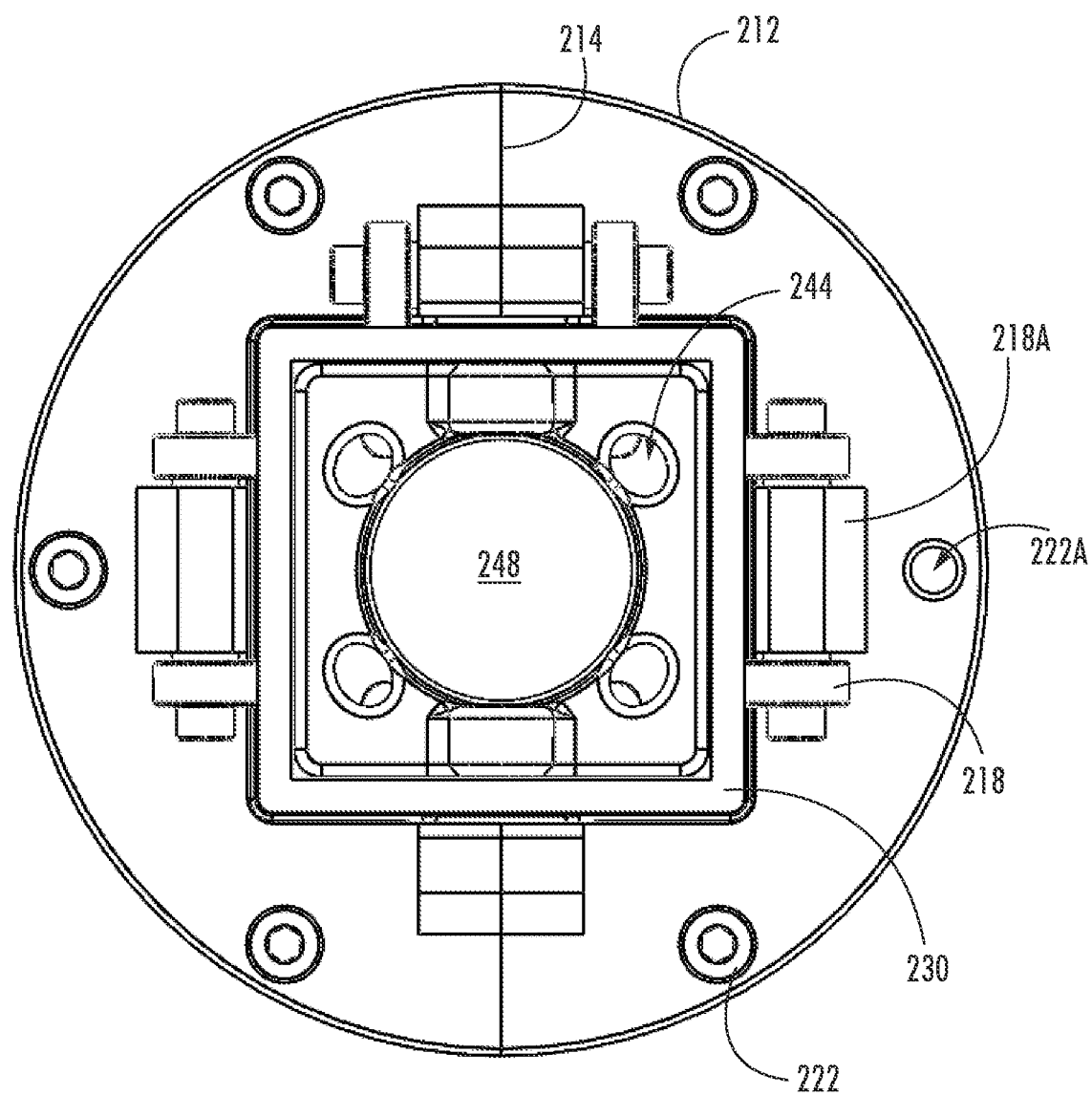
FIG. 8 is an internal view vertically through the linear bearing and the support post, which are shown in FIG. 4, in accordance with the disclosure herein.

FIG. 7 shows the support post positioner 240, which has a perimeter in the shape of a cylindrical disc, which is substantially the same shape as the inner surface of the lower support member 236 (see FIG. 10), which is shown in this embodiment in the form of a hollow cylindrical member. The support post positioner 240 has or defines a recess 242 that has a shape (e.g., a "footprint") that is the same size as the second end of the support post 230 (see FIG. 4) where it is connected thereto. The outer and inner perimeters of the recess 242 are shaped such that a distance therebetween is at least as large as the thickness of the outer walls of the support post 230. The support post positioner 240 is secured, in the embodiment shown, to the support post 230 by passing a threaded member through and from each of the securing holes, generally designated 246, into threaded receivers, generally designated 247 on at least two opposing sides of the support post positioner 240. The support post positioner 240 has at least one or more cable-guiding holes, generally designated 244, that are formed through a thickness of the support post positioner 240. In the embodiment shown, a plurality of (e.g., four) cable-guiding holes 244 are provided and pass from an upper surface to a lower surface within a central portion of the support post positioner 240. These cable-guiding holes 244 are inclined at an angle relative to a vertical axis substantially parallel to the direction of extension of the support post 230. This inclination of the cable-guiding holes 244 may have a radial inclination component to impart a curvature or winding form to the actuation cables passing therethrough (see FIG. 21) so that these cables may be held in a coiled configuration within the lower support member 236. A central void, generally designated 248, is formed and is configured such that the height adjuster 252 (see FIG. 10) can pass therethrough to be secured to the support post 230. In some embodiments, a hole may be formed through the height adjuster 252 that would be aligned to the securing holes 246 for securing the height adjuster to the support post 230. In such embodiments, the receivers 247 may not be threaded so that a connecting rod may freely extend therethrough to interconnect the support post 230, the support post positioner 240, and the height adjuster 252.

Figure 9:
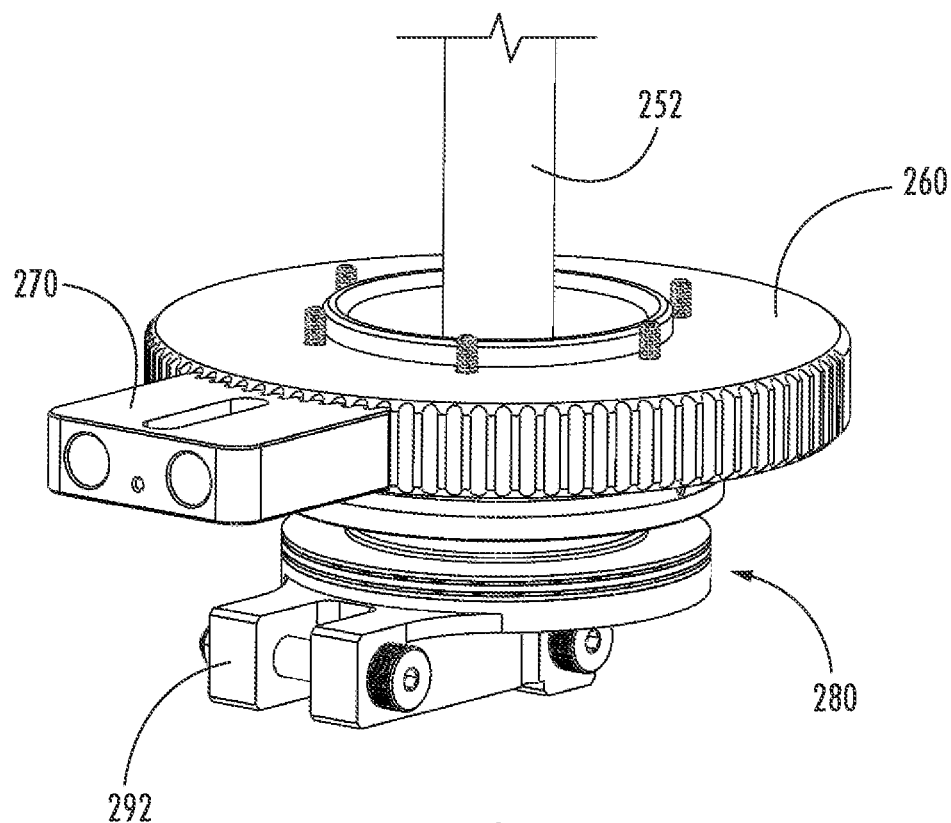
FIG. 9 is a partial view of the column assembly, including the rotary locking system, in accordance with the disclosure herein.
Figure 12:
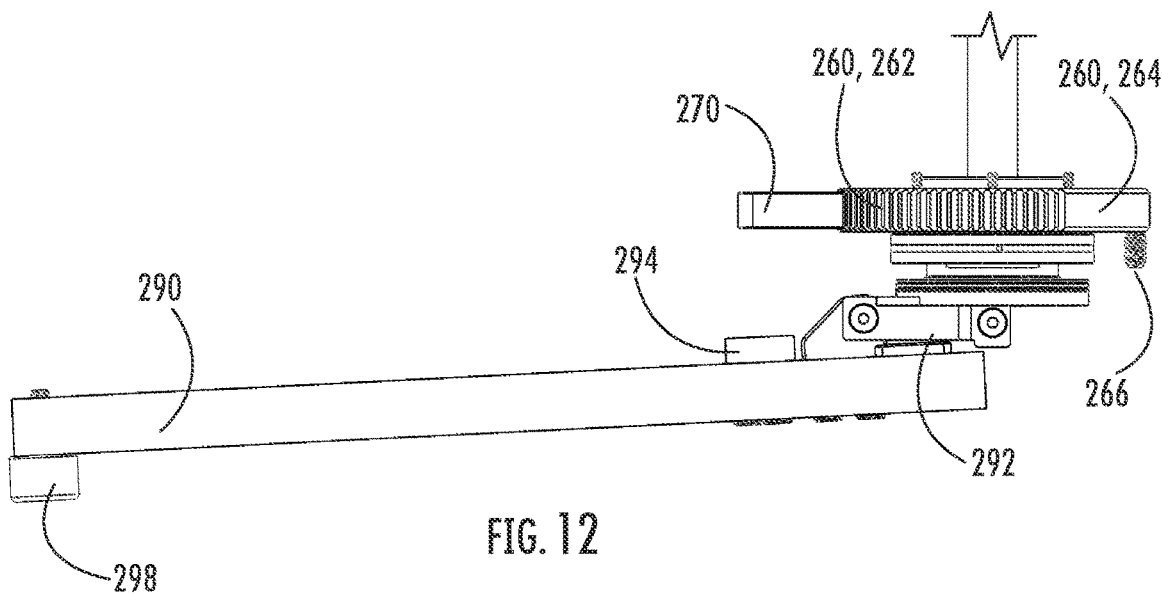
FIG. 12 is a partial view of the bassinet shown in FIG. 1, with the anti-tip safety arm in a deployed position, in accordance with the disclosure herein.
Figure 13:
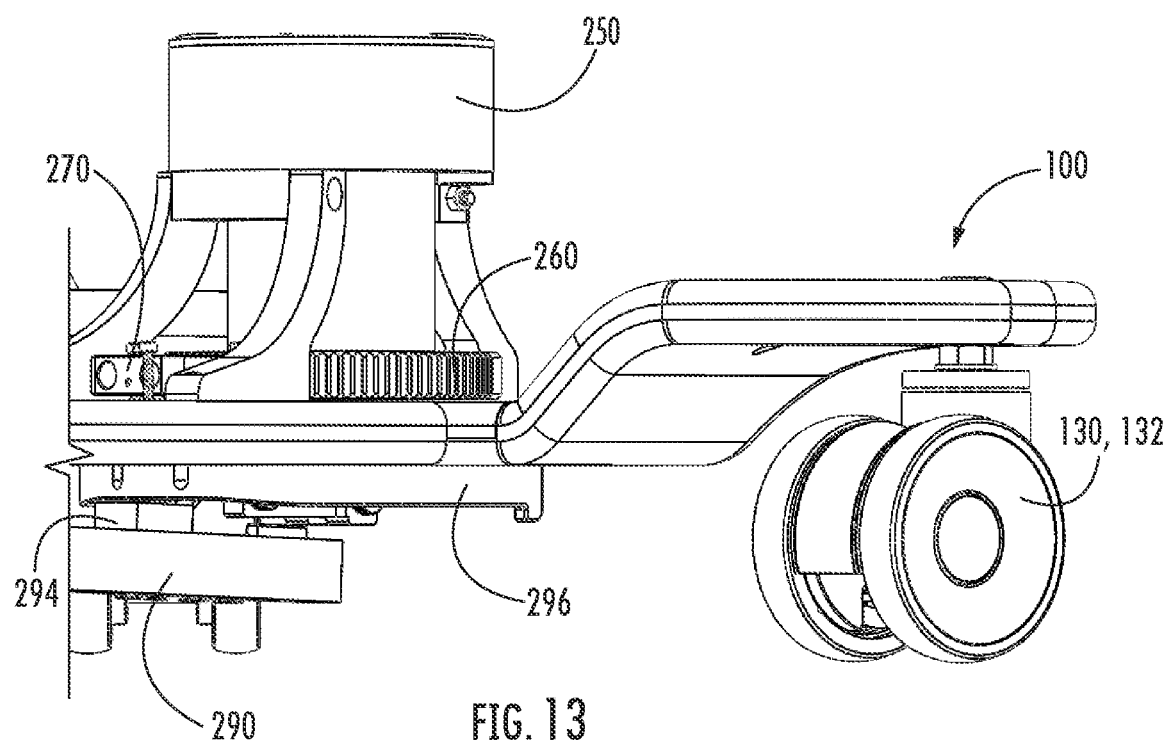
FIG. 13 is a partial view of the base and column assembly of the bassinet shown in FIG. 1, in accordance with the disclosure herein.

The height adjuster 252 is shown in FIG. 9 as fixedly connected to a rotary gear 260, such that they are rotationally locked together, e.g., by threaded members. The rotary gear 260 has a predefined range of rotary movement defined by a toothed region 262 (see FIG. 12). In the embodiment shown, the rotary gear 260 has a maximum range of motion of ±135° from a nominal (i.e. "0°") position. The column assembly 200 is secured to the base by collar 280, which is attached to the base 100 (e.g., at hole 120, see FIG. 3) in the form of a sandwich member, having a two-piece construction with a first piece positioned below the base 100 and a second piece positioned above the base 100. Collar 280 may be in the form of a rotary bearing for smooth rotary movements of the column assembly 200 relative to the base 100. In some embodiments, a bearing may be provided separately from the collar 280. Safety collar 280 is provided at the bottom of column assembly 200 and is rotationally locked to move with the other components of the column assembly 200.

Figure 10:
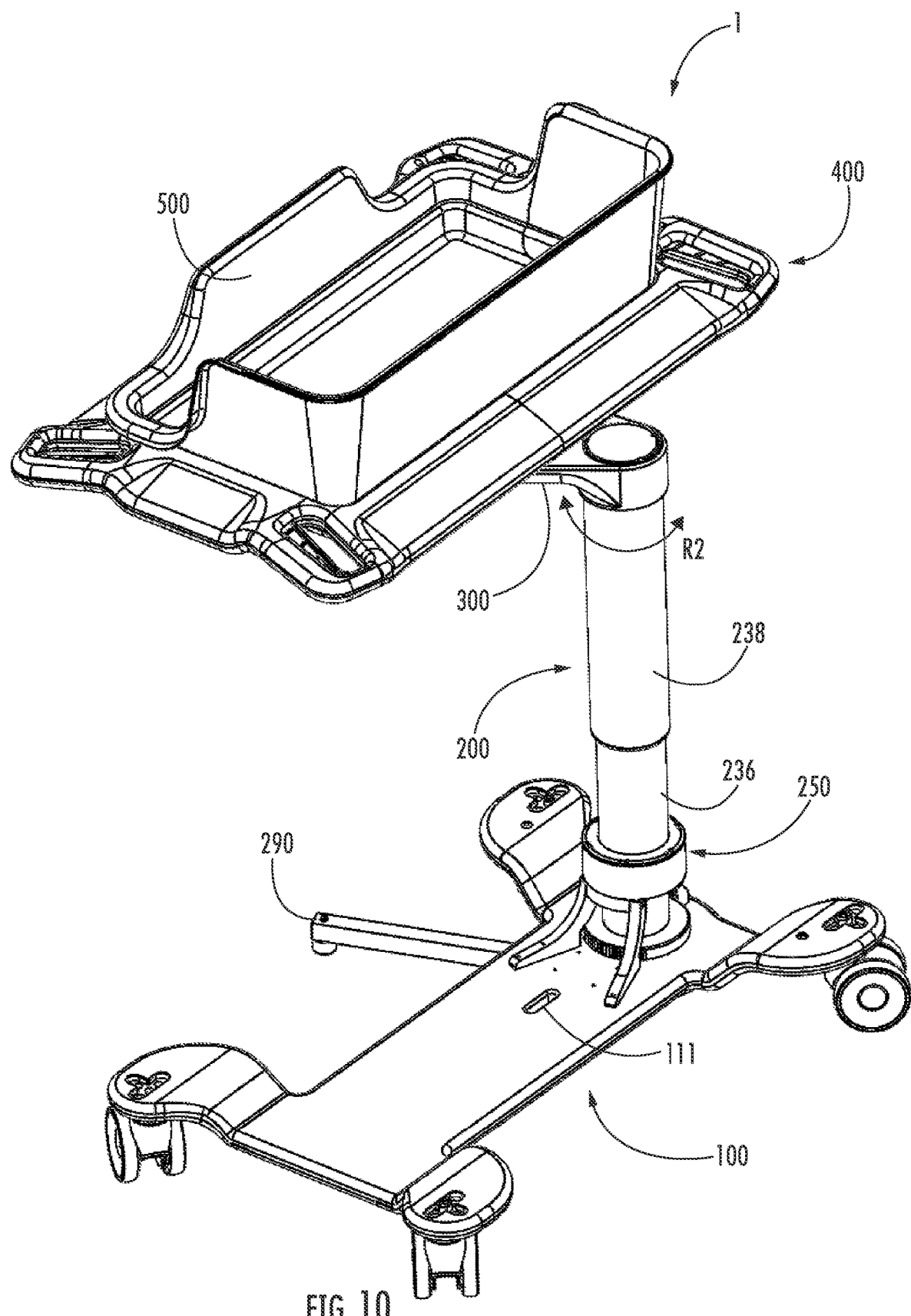
FIG. 10 is an isometric view of the bassinet shown in FIG. 1, with the rotary arm and column assembly being rotated by an angle relative to the base, in accordance with the disclosure herein.

The rotation of arm 300 and column assembly 200 relative to the base 100 is shown in FIG. 10, with the direction of rotation being designated R2 in this view. The internal components of the column assembly 200 are hidden in this view by upper support shroud 238, which is largely a cosmetic, non-load bearing member, and by lower support member 236, which passes through column support 250 is rigidly attached to rotary gear 260 to prevent relative angular movements therebetween. Anti-tip safety arm 290 is shown in the rotated, deployed, position, and is aligned to move radially with arm 300, such that arm 300 and anti-tip safety arm 290 are aligned in a common plane.

Figure 11:
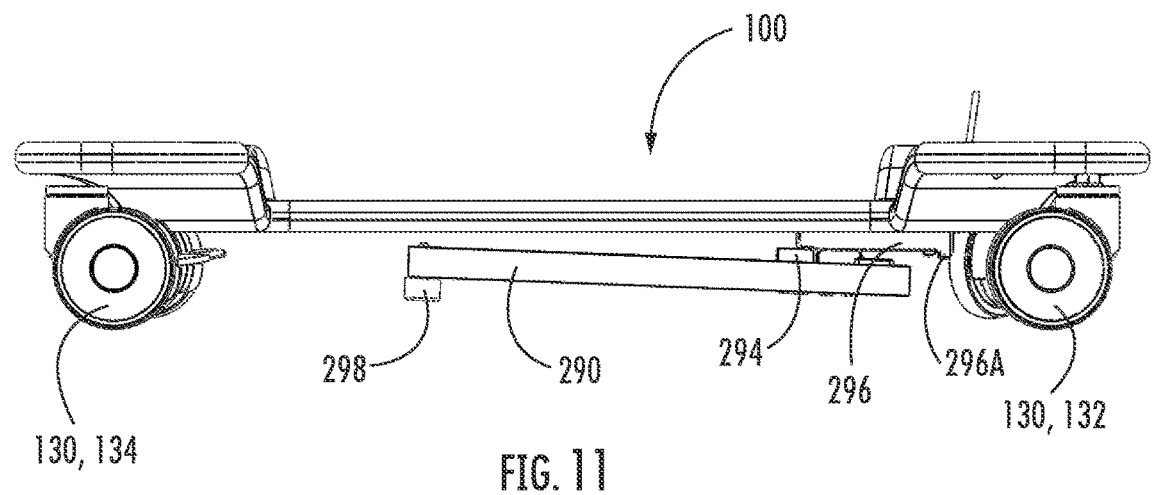
FIG. 11 is a side view of the base of the bassinet shown in FIG. 1, with the anti-tip safety arm in a retracted position, in accordance with the disclosure herein.
Figure 14:
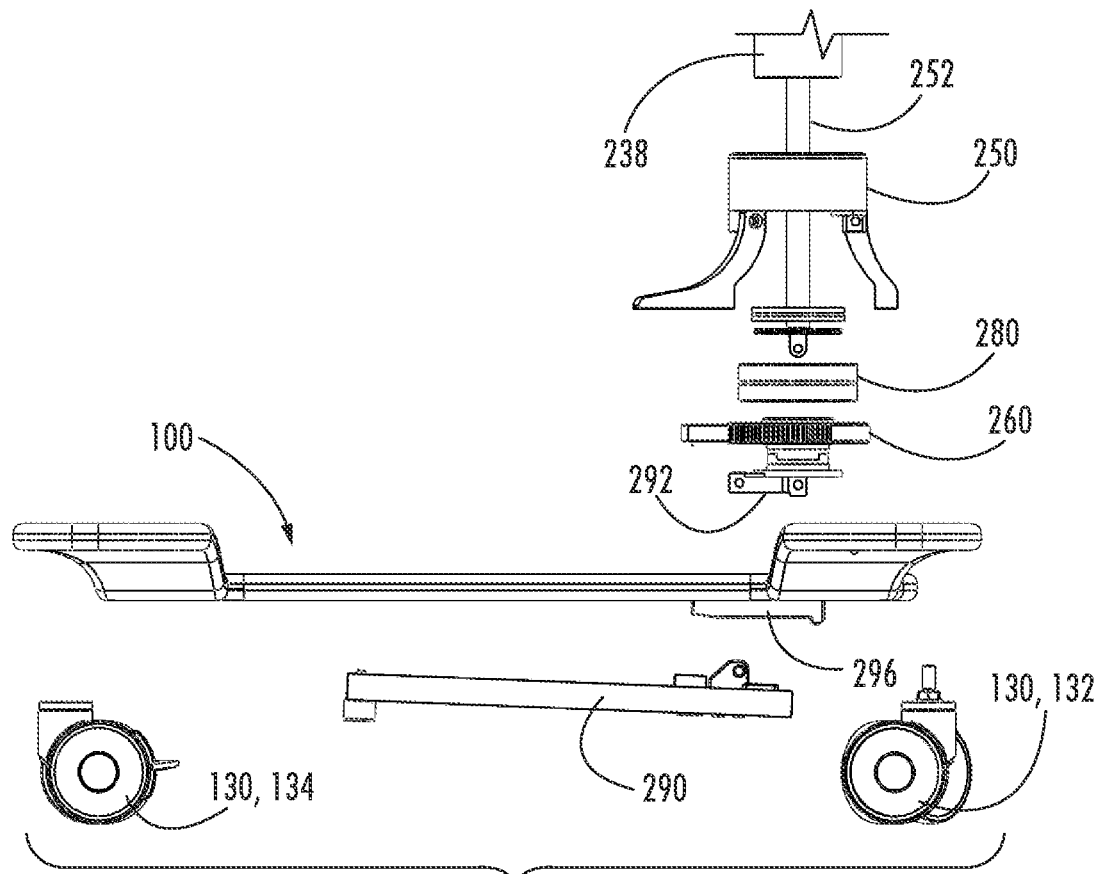
FIGS. 14 and 15 are exploded views of components of the base and the column assembly, in accordance with the disclosure herein.
Figure 15:
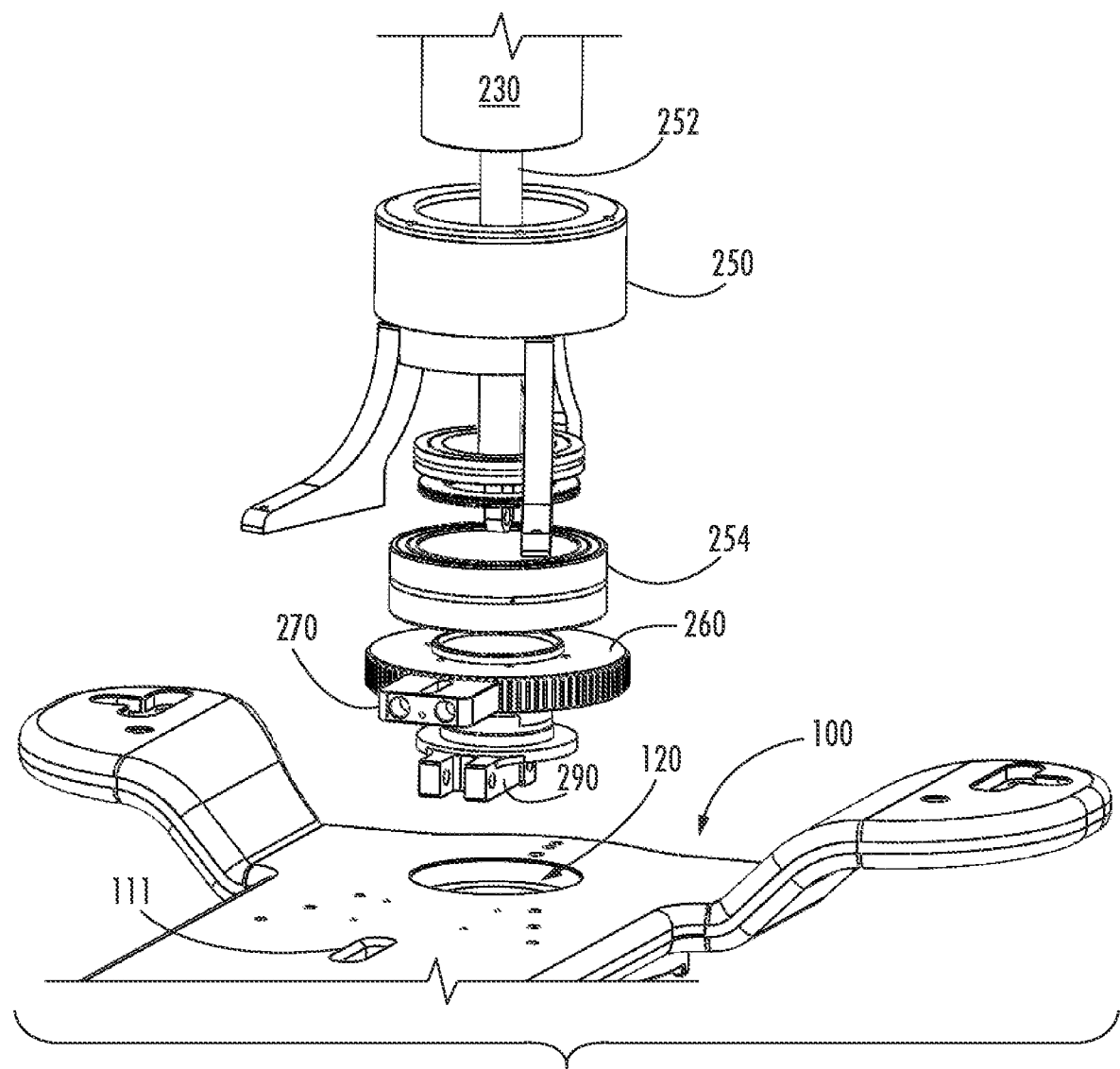

FIGS. 11-15 show the anti-tip safety arm 290 in the retracted and deployed positions. In FIG. 11, the anti-tip safety arm 290 is arranged in the retracted position. Anti-tip safety arm 290 can comprise an anti-skid footing 298 at a distal end thereof, which can be made of, for example, rubber or any material of sufficient durometer. Anti-tip safety arm 290 is rotatably locked to move along with rotational movements of the column assembly by being secured to anti-tip safety arm mount 292 at a proximal end of anti-tip safety arm 290. Anti-tip safety arm 290 also has actuating member 294 attached adjacent to the proximal end of anti-tip safety arm 290. Actuating disc 296 is provided in the form of an arc on a bottom surface of base 100 and actuating member 294 is positioned on anti-tip safety arm 290 to interface with actuating disc. Actuating disc has a reduced height at the central position, such that anti-tip safety arm 290, which is spring-biased in the upward direction (e.g., towards the base 100), is moved to the retracted position when the actuating member 294 is located within the reduced height region of the actuating disc. Similarly, when the column assembly 200 and anti-tip safety arm 290 are rotated from the nominal position, the actuating member 294 rotates and is displaced vertically downwards by the increased thickness of the actuating disc 296 away from the nominal position. In the embodiment shown, the actuating disc 296 has rotational stop elements 296A positioned at the extremes of the arc defined by the actuating disc 296 to prevent excess movement of anti-tip safety arm 290 beyond the bounds of the safety disc. In some embodiments, the rotational stop elements 296A can be used to define the maximum amount of rotation of the column assembly 200 and arm 300 to prevent excessive rotation thereof relative to the base 100. The angular position of the column assembly 200 and the arm 300 is maintained by engagement of the rotary lock 270 with the toothed portion 262 of the rotary gear 260. The rotary lock 270 is slidingly attached to the base 100 at slot 111 (see FIG. 10). By slidingly actuating rotary lock 270 to move radially away from the rotary gear 260, it is possible to rotate column assembly 200 and arm 300 relative to base 100. Once rotary lock 270 is slidingly reengaged with the toothed portion 262 of rotary gear 260, relative angular movements between the base 100 and the column assembly 200 are prevented. Rotary lock 270 and the rotary gear 260 have interlocking gear teeth formed therein that are complementary (e.g., having a shape and size that mesh together). The granularity of rotational movement of the column assembly 200 relative to the base 100 is determined by the size and pitch of the gear teeth of the rotary gear 260 and the rotary lock 270. FIGS. 14 and 15 are exploded views of the components of the column assembly 200 that engage with and enable rotational movement relative to the base 100.

Figure 16:
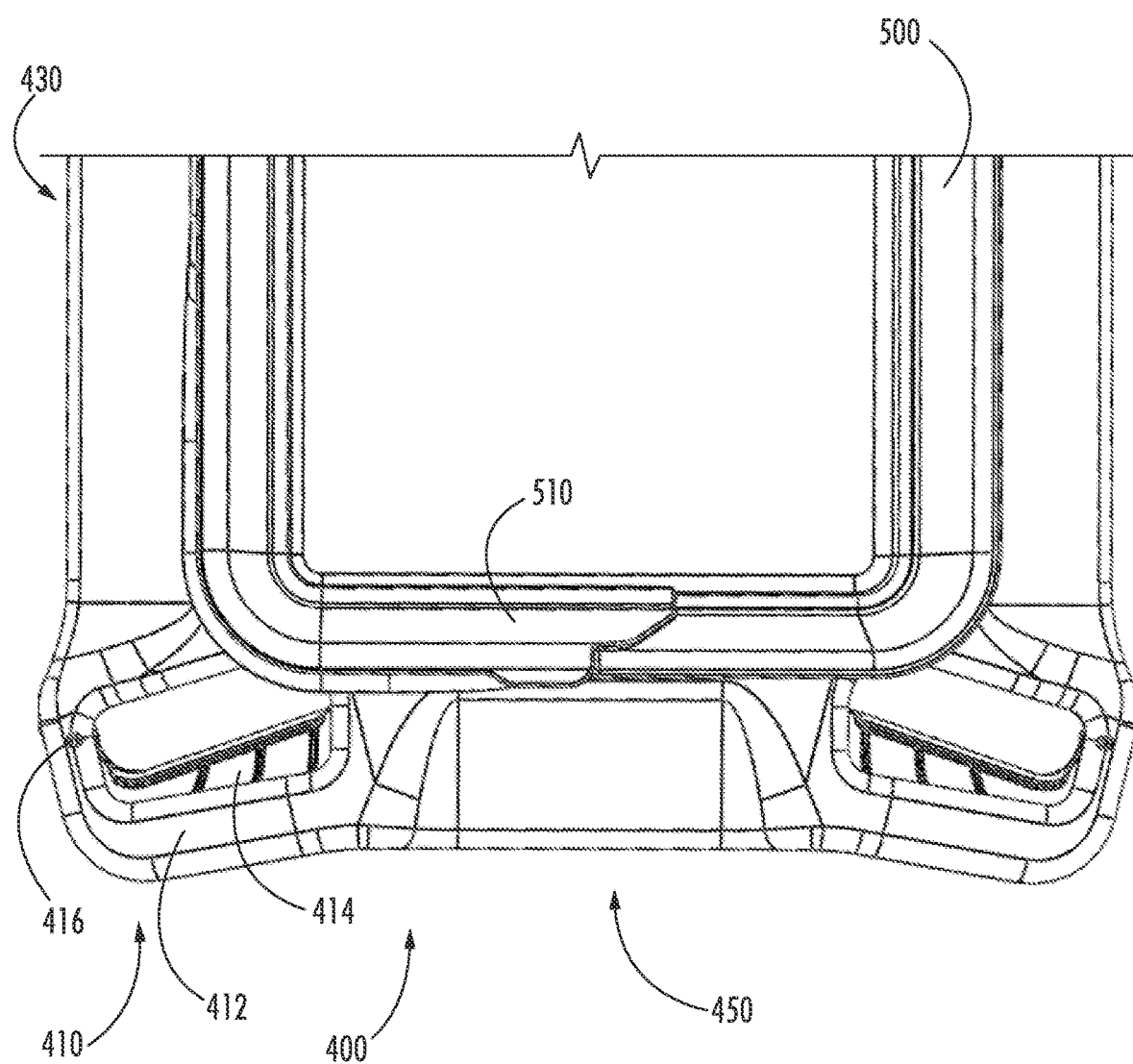
FIGS. 16 and 17 are partial top views of the infant tub and tub frame of the bassinet shown in FIG. 1, in accordance with the disclosure herein.
Figure 17:
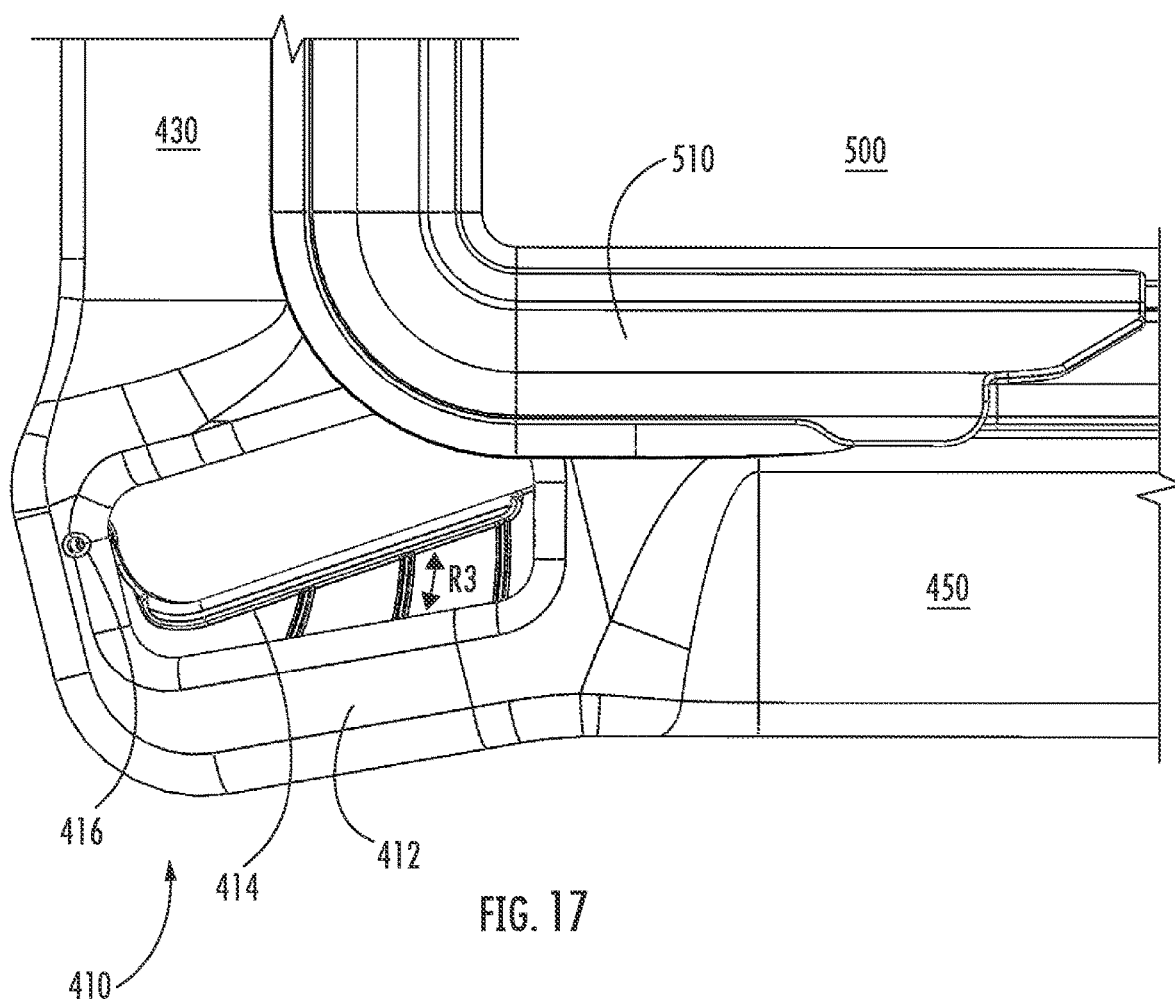

FIGS. 16 and 17 show the wheel handles, generally designated 410, that are attached to the tub frame 400. Wheel handles 410 control disengaging the automatic locking feature of the rear wheels 132 (see, e.g., FIG. 21) to allow for movement of the bassinet 1, for example, for transport of an infant or positioning of the bassinet 1 relative to a substantially stationary object, such as a hospital bed. While only a single wheel handle 410 may be provided, in this embodiment tub frame 400 comprises a plurality of wheel handles 410, specifically a quantity of four wheel handles 410, each of which are arranged on a corner of the tub frame 400, which has a substantially rectangular perimeter shape. Each first handle has a handle grip 412 and an actuator 414, which is captive within handle drip 412. Actuator 414 pivots, when squeezed against handle grip 412 by a user, about hinge 416. As such, actuator 414 moves in the direction R3 which is oriented circumferentially to hinge 416. First handle may be integrally formed into the tub frame 400 or may be removably attached thereto. The operation of the wheel handles 410 will be discussed further hereinbelow with respect to FIGS. 20 and 21.

Figure 18:
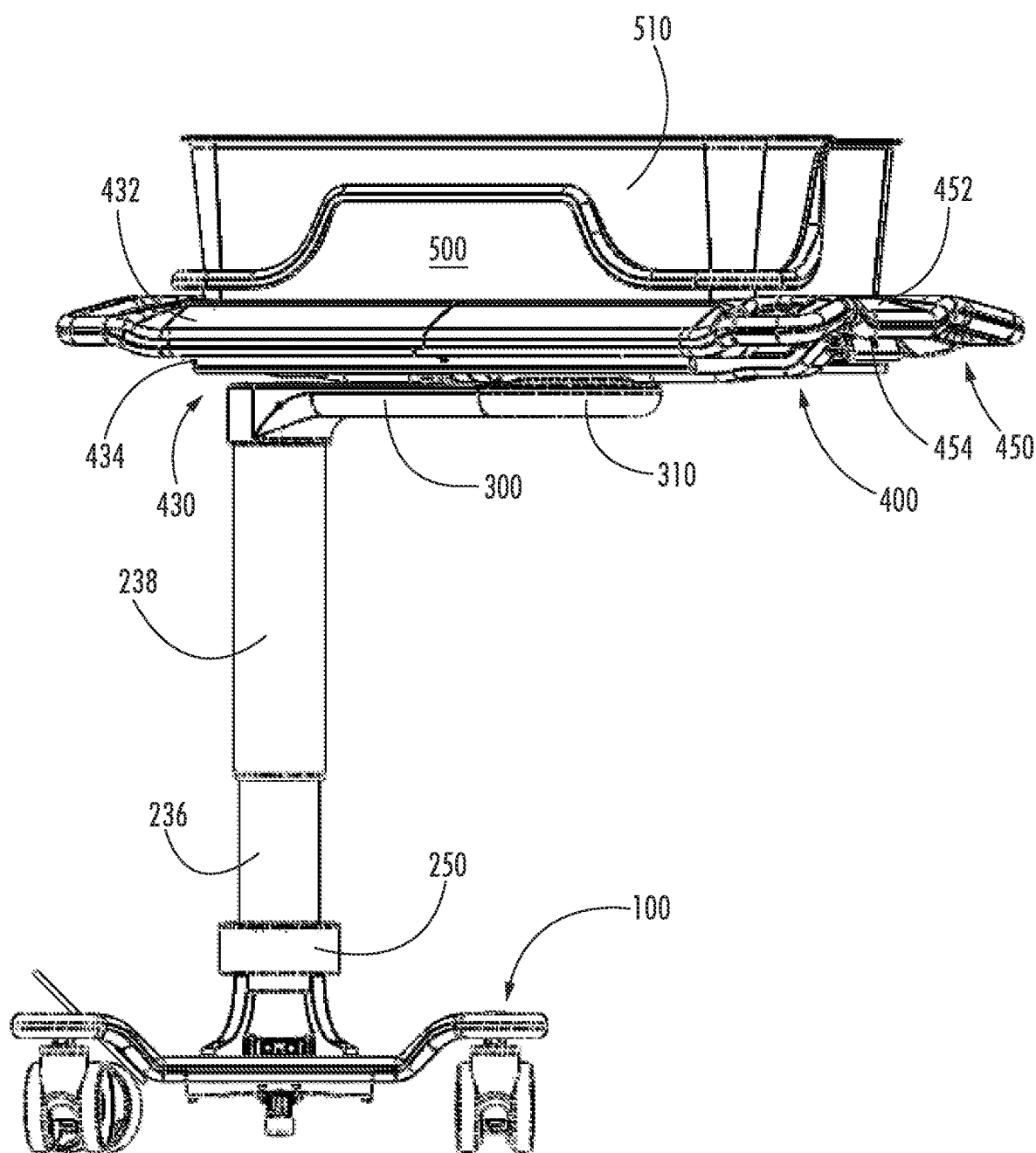
FIG. 18 is a front view of the bassinet shown in FIG. 1, with the rotary arm being arranged at an angle relative to the base, in accordance with the disclosure herein.
Figure 19:
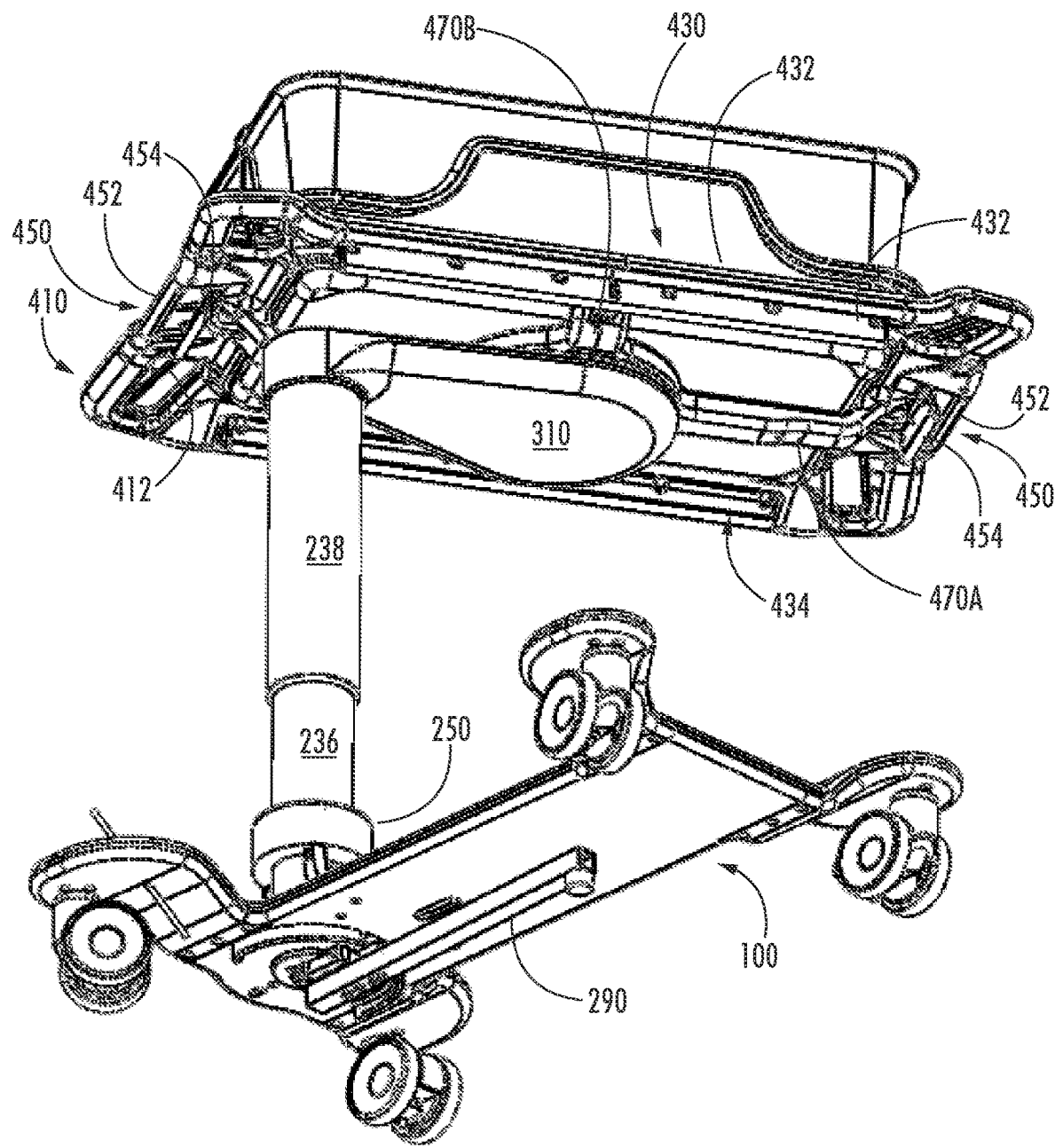
FIG. 19 is an isometric view of the bassinet in the configuration shown in FIG. 18, in accordance with the disclosure herein.

FIGS. 17-19 show pivot/rotation handles, generally designated 430, and height handles, generally designated 450, as part of the tub frame 400. Each of pivot/rotation handles 430 and height handles 450 are integrally formed as part of the tub frame 400, but in some embodiments one or both may be removably attached or affixed to tub frame 400. While only a single pivot/rotation handle 430 and a single height handle 450 may be provided in some embodiments, in the example embodiment shown, a plurality of pivot/ rotation handles 430 and a plurality of height handles 450 are provided as part of the tub frame 400. Specifically, two pivot/rotation handles 430 and two height handles 450 are provided. The two pivot/rotation handles 430 are shown as being arranged on opposite sides/ends of the tub frame 400, the sides/ends of the tub frame 400 on which the pivot/ rotation handles 430 are arranged being the sides of the bassinet 1 from which the infant is to be removed from or placed within the infant tub 500 (e.g., the long sides of the tub frame 400). The two height handles 450 are shown arranged on opposite sides/ends of the tub frame 400, the sides/ends of the tub frame 400 on which the height handles 450 are arranged being the sides of the bassinet 1 which the head or feet of the infant are to be adjacent when the infant is in the infant tub 500 (e.g., the short sides of the tub frame 400). The quantities and locations described hereinabove regarding the wheel handles 410, the pivot/rotation handles 430, and the height handles 450 are merely examples and these handles may be combined in any location and quantity without deviating from the scope of the subject matter disclosed herein.

The pivot/rotation handles 430 have a grip 432 that is molded into the tub frame 400 along the length of the opposing long edges thereof. This location of the pivot/ rotation handles is contemplated as being advantageous because it will be more easily accessible by mobility-impaired users, such as, for example, new mothers. Located underneath the grip 432 is one or more actuation bars 434 that a user can linearly actuate by pulling the actuation bar 434 towards the perimeter edge of the grip 432 while holding grip 432. The actuation bar 434, when actuated, allows for the column assembly 200 and the arm 300 to rotate relative to the base 100, while simultaneously allowing for the tub frame 400 and the infant tub 500 to rotate and/or pivot about the substantially circular hub 310 of arm 300. In this embodiment collar 250 does not rotate with respect to base 100, but is instead rigidly attached thereto, so that lower support member 236 rotated within the collar 250. In the embodiment shown, pivot/rotation handles 430 have a single stage actuation, such that the rotating movement of arm 300 and column assembly 200 and the pivoting movement of tub frame 400 and infant tub 500 are activated substantially simultaneously. In some embodiments, however, pivot/rotation handles 430 may have dual stage actuation, such that the pivoting movement of the tub frame 400 and the infant tub 500 is activated prior to the rotating movement of arm 300 and column assembly 200 being activated, such that the pivoting movement of the tub frame 400 and the infant tub 500 is activated with a lesser degree of movement of actuation bar 434 than is necessary to activate the rotating movement of arm 300 and column assembly 200. The opposite is also true, such that the rotating movement of arm 300 and column assembly 200 may be activated prior to the pivoting movement of the tub frame 400 and the infant tub 500. In some further embodiments, the rotating movement of arm 300 and column assembly 200 and the pivoting movement of the tub frame 400 and the infant tub 500 may each be controlled by a physically separate set of handles. These physically separate sets of handles can have a common or separate grips.

The height handles 450 have a grip 452 that is molded into the tub frame 400 along the length of the opposing short edges thereof. Located underneath the grip 452 is one or more actuation tabs 454 that a user can linearly actuate by pulling the actuation tab 454 towards the perimeter edge of the grip 452 while holding grip 452. Height handles 450, because they are on a same edge as the wheel handles 410, have a significantly reduced width compared to the pivot/rotation handles 430. The actuation tab 454, when actuated, allows for the actuation of the height adjuster 252 (see, e.g., FIG. 4), allowing a user to increase or decrease a length of the column assembly 200 and, accordingly, the height of the tub frame 400 and the infant tub 500 relative to the surface on which the base 100 is supported, for example, the ground. Upper support shroud 238 slides vertically over and/or around the perimeter of the lower support member 236. In some embodiments, a lower vertical stop can be selected based on the length of the upper support shroud 238, such that upper support shroud 238 will contact collar 250 when at the minimum operable height of the bassinet 1. The length of upper support shroud 238 is selected such that, at a maximum operable height of the bassinet 1, it remains circumferentially engaged around at least a portion of the lower support member 236. This feature is both aesthetically pleasing and functional, both hiding the linear bearing 210 (see FIGS. 4-8) and ensuring that no alignment features are needed to maintain circumferential alignment of the upper support shroud 238 and the lower support member 236, which could cause a binding or jam of the bassinet if they were allowed to become separated during use and did not maintain sufficiently precise alignment with respect to each other.

Hub 310 has a substantially circular shape and is substantially hollow, except for cable guide features, such as walls, retaining clips, and the like, to allow for adequate cable management for the cables needed for actuation of the wheel handles 410, the pivot/rotation handles 430, and the height handles 450 to each achieve their stated functions. Hub 310 has a substantially open top surface that mates with a corresponding surface of the tub frame 400, which will be shown and described in greater detail regarding FIG. 20. FIG. 19 shows an alternate embodiment of the bassinet, with anti-tip safety arm 290 being able to be selectively disengaged from the rotational movements of arm 300 and column assembly 200.

Figure 20:
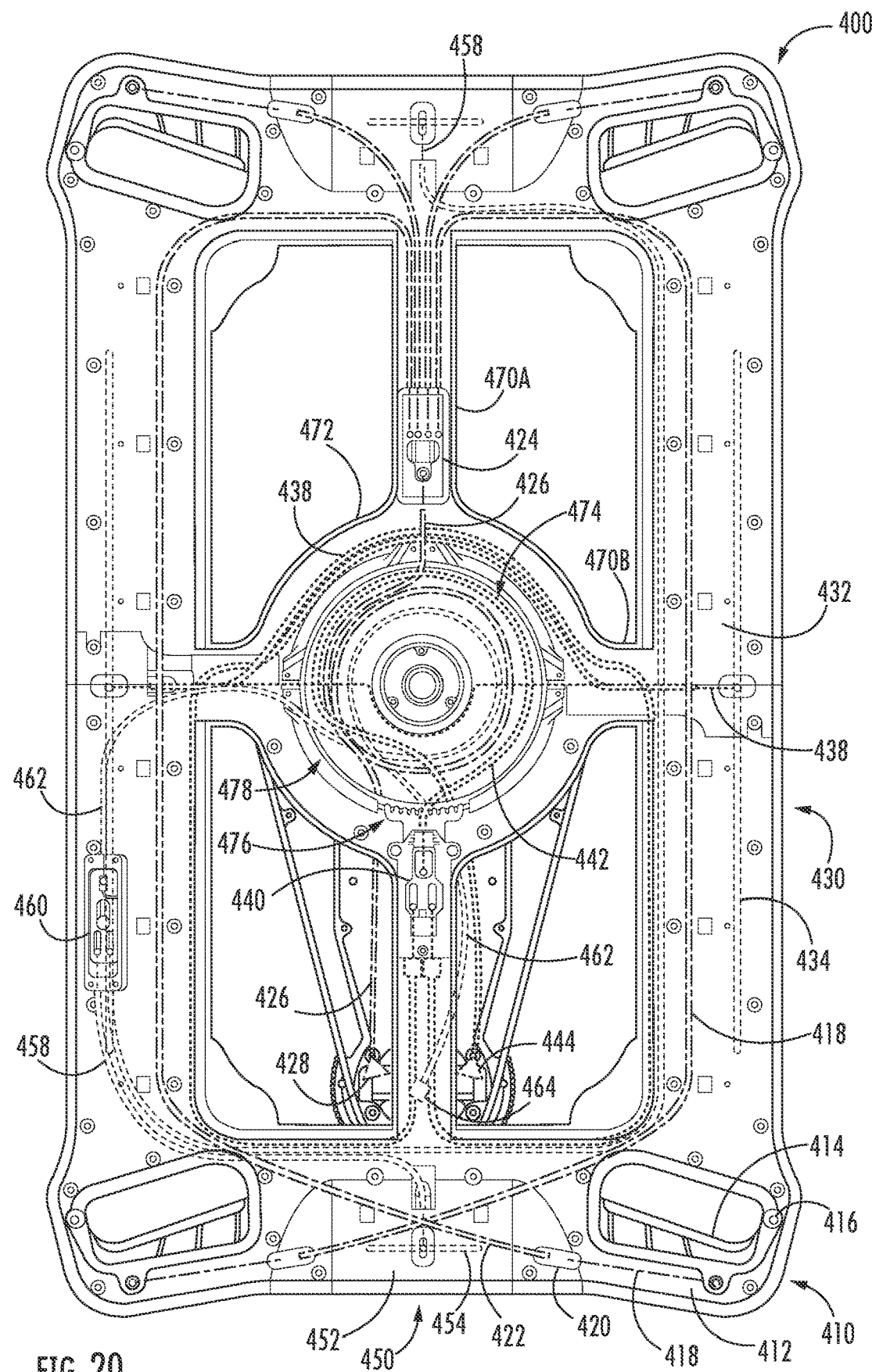
FIG. 20 is a schematic illustration of a routing path for the actuating cables within the tub frame and rotary arm of the bassinet shown in FIG. 1, in accordance with the disclosure herein.
Figure 21:
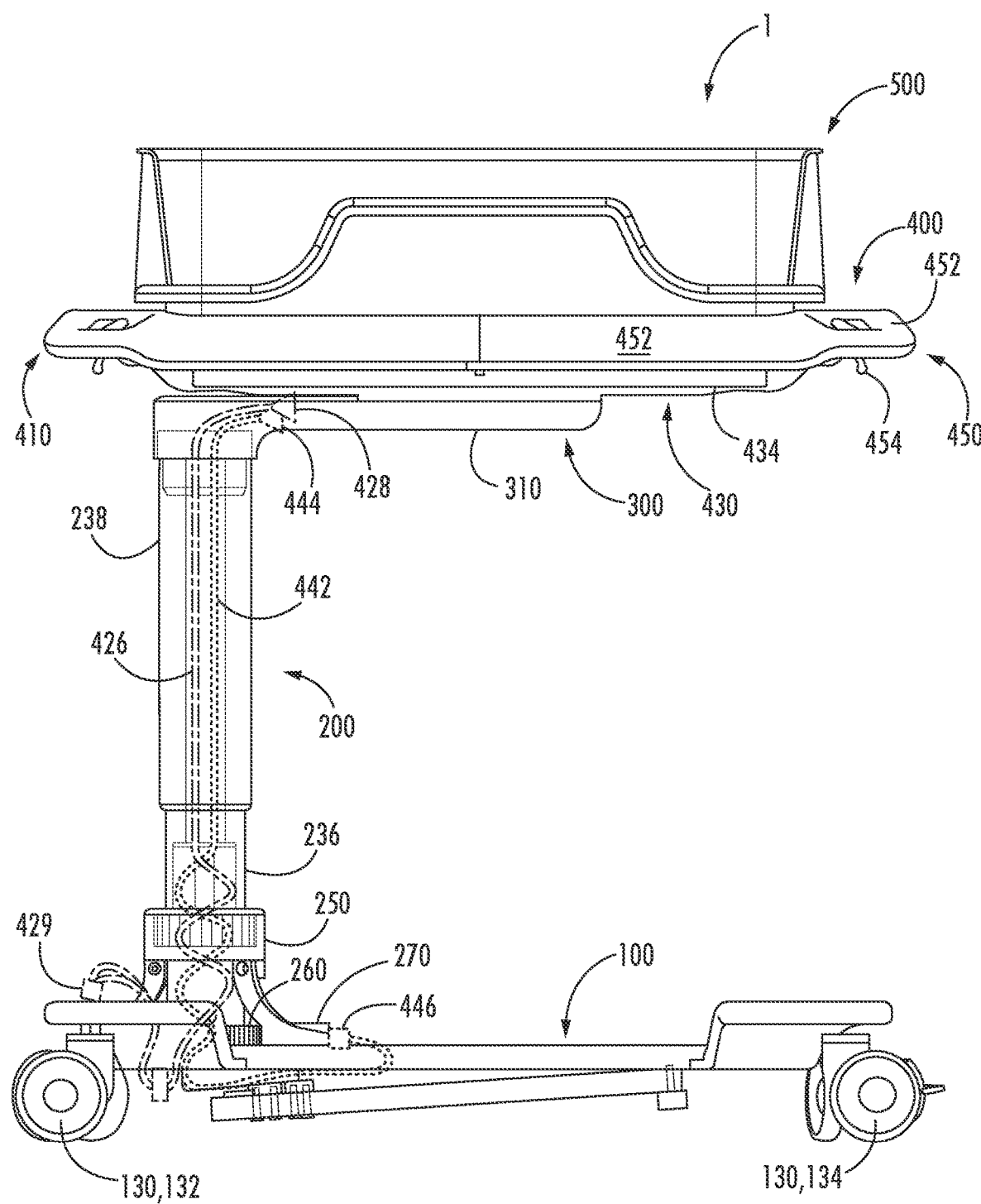
FIG. 21 is a schematic illustration of a routing path for the actuating cables through the column assembly and the base of the bassinet shown in FIG. 1, in accordance with the disclosure herein.
Figure 22:
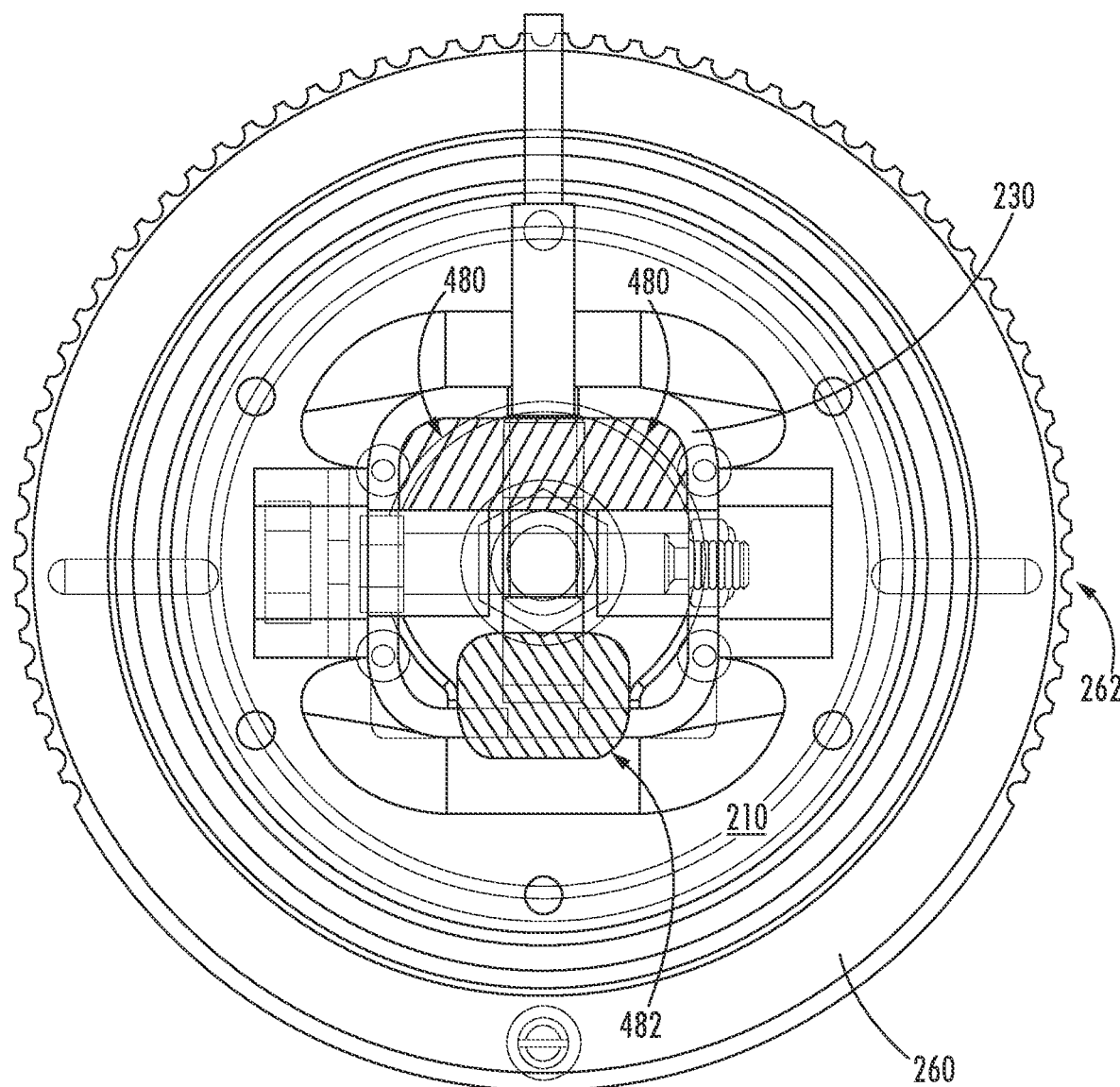
FIG. 22 is a schematic top view through the linear bearing, showing the ingress and egress regions for the actuating cable passing therethrough, in accordance with the disclosure herein.

FIGS. 20-22 show the various aspects of the cable routing for the plurality of handles 410, 430, 450 provided in the tub frame 400. Tub frame 400 has a central hub 472 that is attached to hub 310 of arm 300 to create a substantially enclosed area in which actuation cables can be routed without being externally visible. Tub frame 400 has an at least partially hollow perimeter portion that is connected to the hub 472 by lateral ribs 470A, 470B, which can be entirely enclosed so the cables routed therethrough are not externally accessible or visible. To allow the pivoting movement of the tub frame 400 and the infant tub 500 and the rotary movement of the arm 300 to occur simultaneously and over their respective maximum degrees of angular movement (in the embodiment shown, both are capable of rotating/pivoting ±135° from a central, or nominal, position at "0°").

For the rear wheels 132 (see, e.g., FIG. 3) to be unlocked, the actuator 414 is connected to first wheel cable 418 and pulls the first wheel cable 418 as the actuator 414 pivots about hinge 416. First wheel cable 418 is connected to first wheel cable interface 420, which is configured to be held substantially stationary and/or for only linear movement in the direction in which first wheel cable is pulled when actuator 414 is squeezed. First wheel cable interface 420 is connected to a second wheel cable 422, which extends towards, and is connected to, wheel cable reducer 424, which is configured to receive inputs from a plurality of second wheel cables 422 and actuate a third wheel cable 426 as an output when any of second wheel cables 424 transmit an actuation movement to wheel cable reducer 424. Third wheel cable 426 is routed through hubs 472 and 310, through arm 300, and to column assembly 200 at interim terminus 428. From interim terminus 428, third wheel cable 426 is routed vertically through column assembly 200, including, for example, through support post 230, linear bearing 210, support post positioner 240, and rotary gear 260, to be output from the bottom surface of the base 100 and is connected to each of rear wheels 132 such that, when actuated, the lock of each rear wheel 132 is deactivated so that bassinet 1 can be moved.

For the pivoting and rotational movements of the tub frame 400 and the arm 300, respectively, each actuator bar 434 is connected to the first pivot cable 438 and pulls the first pivot cable 438 as the actuator bar 434 is moved in the direction of the perimeter of grip 432. First pivot cables 438 pass through hub 310, 472, and are directed through the outer perimeter portion of the tub frame 400 to the pivot cable reducer 440. Pivot cable reducer 440 is configured to perform two actions simultaneously when receiving an actuation input from either of the plurality of first pivot cables 438 attached to an input side thereof. In a first aspect directed to the control of the rotary movement of the arm 300 and the column assembly 200 about base 100, the pivot cable reducer 440 transmits a corresponding output to a rotary cable 442 that is routed through and around the hub 310, 472 and into arm 300 to pass into and through the column assembly 200 at interim terminus 444. In a second aspect directed to the control of the pivoting movement of the tub frame 400 and the infant tub 500 relative to the arm 300, the pivot cable reducer 440 actuates a pivot lock 476 radially away from a central pivot gear 478 located within hub 310, 472 to allow for rotation of the pivot gear 478 relative to the pivot lock 476. When the actuating input from first pivot cable 438 is no longer received at the pivot cable reducer, the pivot lock 476 moves back to engage with the pivot gear 478, which is integrally formed with, or rigidly attached or affixed to, tub frame 400 within hub 472, to prevent the pivoting movement of the tub frame 400 and infant tub 500 relative to arm 300. In some embodiments, the pivot gear 478 can be integrally formed or rigidly attached or affixed within hub 310 of arm 300. From interim terminus 444, rotary cable 442 is routed vertically through column assembly 200, including, for example, through support post 230, linear bearing 210, support post positioner 240, and rotary gear 260, to be output from the bottom surface of the base 100 and is connected to rotary lock 270 such that, when actuated, the rotary lock 270 disengages from (e.g., moves radially away from) rotary gear 260 so that column assembly 200 and arm 300 can rotated relative to base 100.

In the region within lower support member 236 below support post positioner 240, the third wheel cable 426 and the third pivot cable 442 are coiled in a substantially double helix arrangement (e.g., in a spring-like shape) which is vertically compressible, such that the pitch between each "coil" of each helix is variable based on the height at which the column assembly 200 is set. As such, when the column assembly 200 is extended vertically, each helix becomes elongated and the coils of the helix are spaced further apart. Similarly, when the column assembly is shortened vertically, each helix becomes correspondingly compressed and the coils of the helix are spaced closer together.

To control the height adjustment of the bassinet 1, which is accomplished by changing the length of the column assembly 200, each actuator tab 454 is connected to a first height adjustment cable 458 and pulls the first height adjustment cable 458 as the actuator tab 454 is moved in the direction of the perimeter of grip 452. First height adjustment cables 458 pass through the outer perimeter portion of the tub frame 400 to the height adjustment cable reducer 460. Height adjustment cable reducer 460 receives an input from one of the first height adjustment cables 458 and transmits an actuation movement via a second height adjustment cable 462, which passes into and around the hub 310, 472 and is operably connected to height adjustment terminus 464 within column assembly 200, such that the height adjuster 252 is activated to alter a length of the column assembly, thereby changing a height of the tub frame 400 and infant tub 500.

Various cable routing features are provided within and/or on tub frame 400, arm 300, column assembly 200, and base 100 to maintain proper cable routing and ensure that actuations of the respective cables are transmitted from the respective handles to the respective actuation points within the bassinet 1. In FIG. 22, a top view through column assembly is provided, with inlet regions 480 designating areas at the top of the column assembly 200 (e.g., at an inlet of the arm collar 320, see FIG. 4) through which respective actuation cables may pass therethrough. Similarly, exit regions 482 are shown at the bottom of the column assembly 200 (e.g., at a bottom of the post support positioner 240, see FIG. 4 through which respective actuation cables may pass therethrough.

Figure 23:
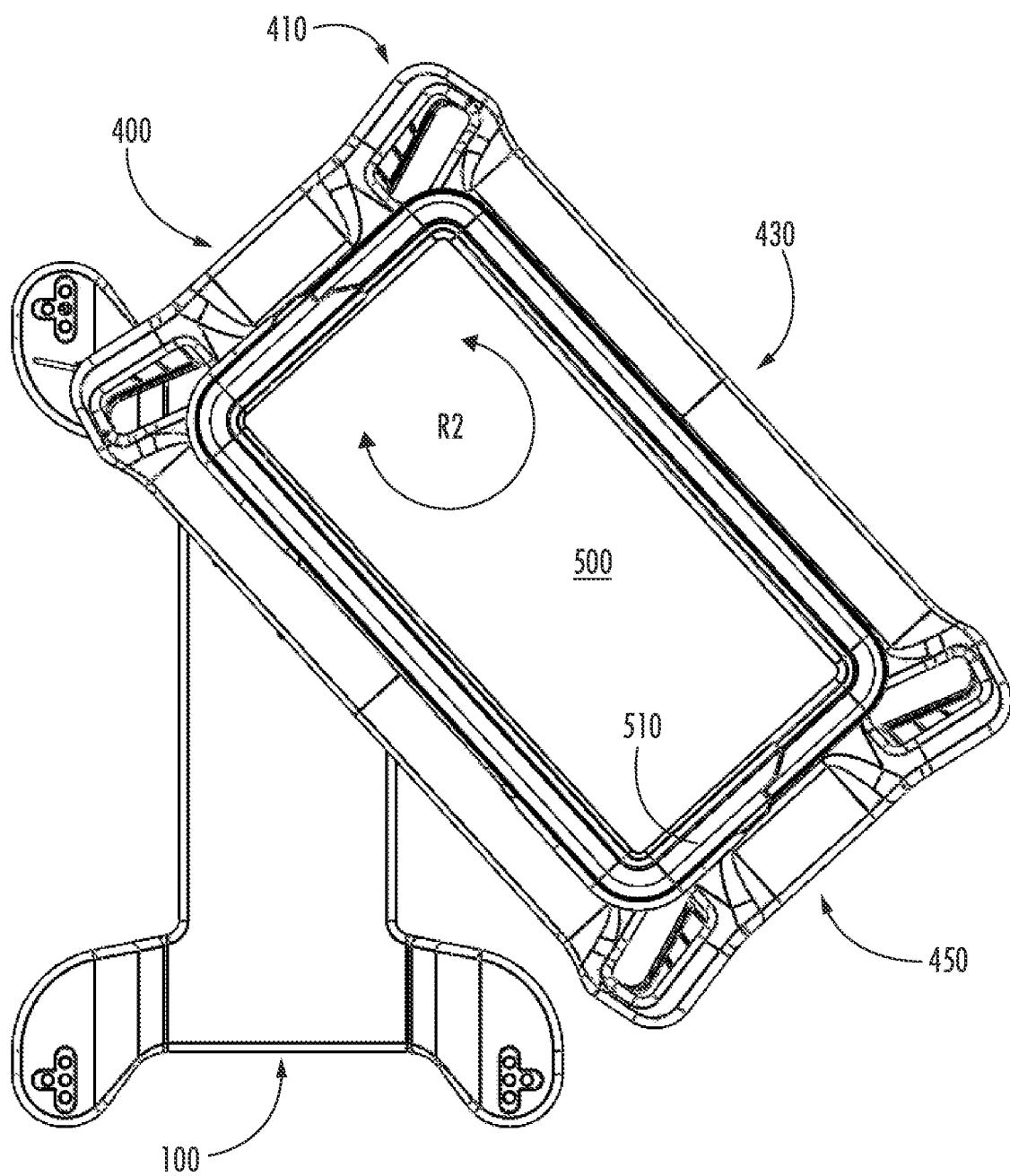
FIG. 23 is a top view of the bassinet shown in FIG. 1, with the rotary arm rotated relative to the base, in accordance with the disclosure herein.
Figure 24A:
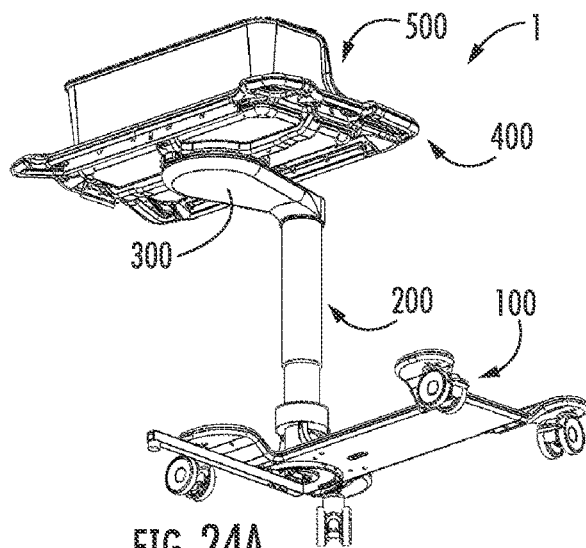
FIGS. 24A-24E are isometric views showing the rotary arm of the bassinet shown in FIG. 1 in various rotatable positions relative to the base, in accordance with the disclosure herein.
Figure 24B:
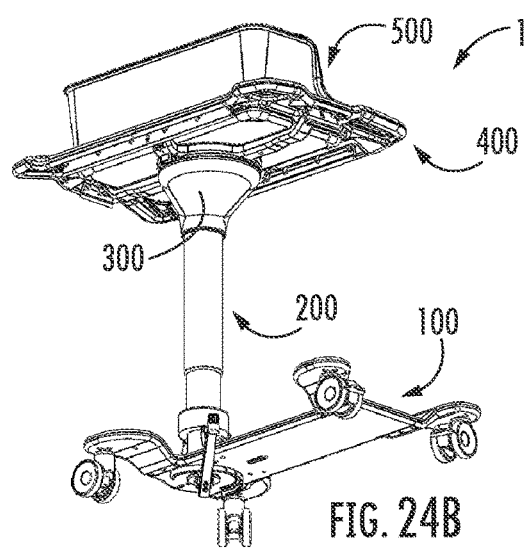
Figure 24C:
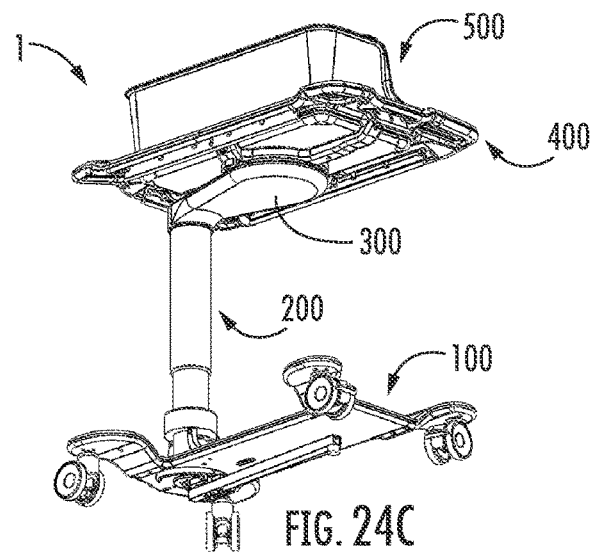
Figure 24D:
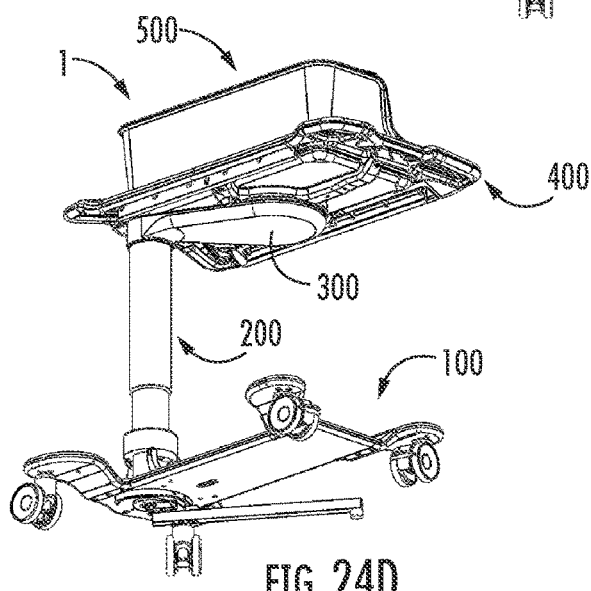
Figure 24E:
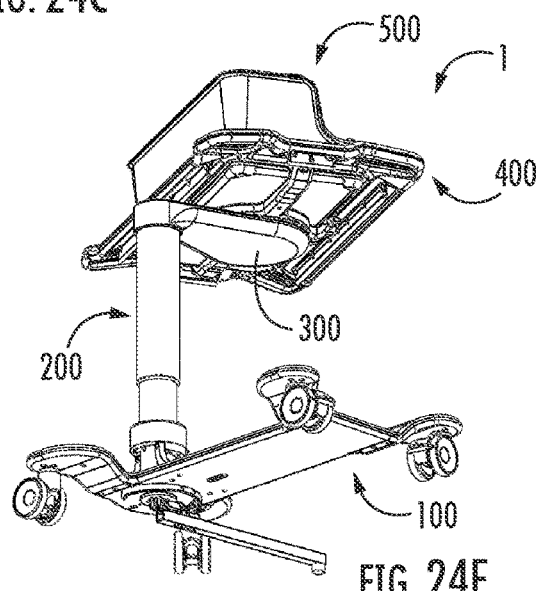
Figure 25:
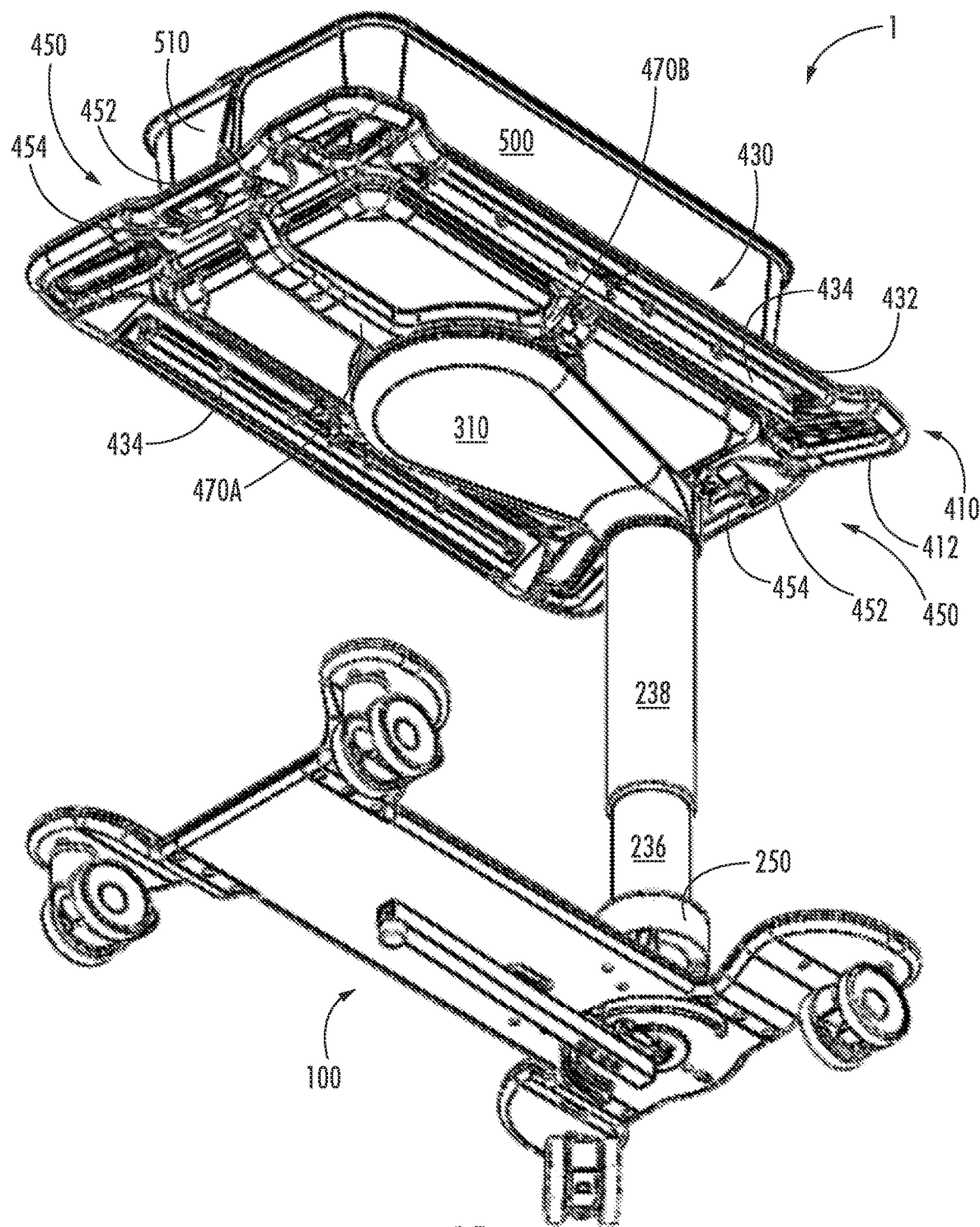
FIG. 25 is an isometric view of the bassinet shown in FIG. 1, in accordance with the disclosure herein.
Figure 26:
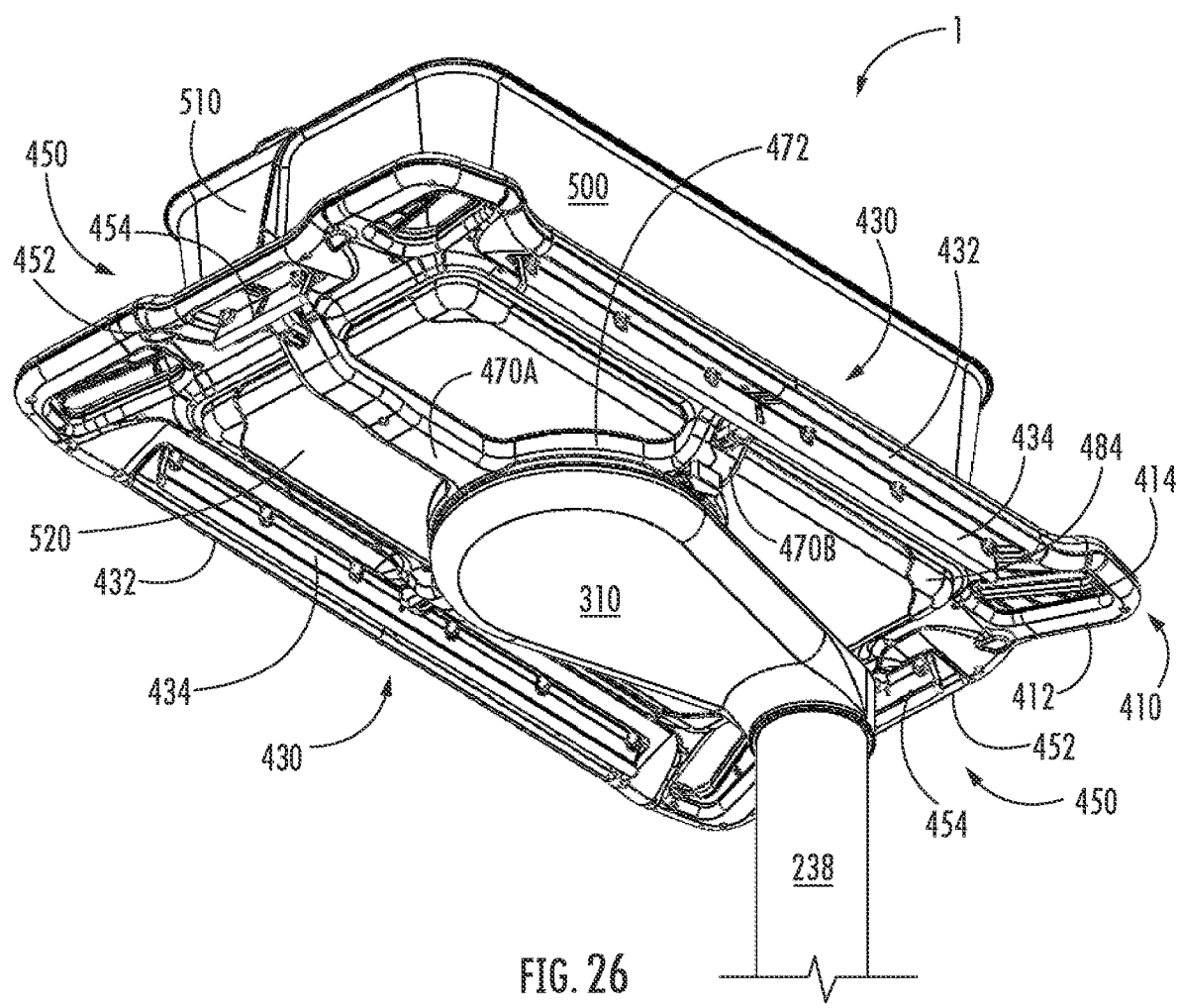
FIG. 26 is an isometric partial view of the bassinet shown in FIG. 1, showing the column assembly, the rotary arm, the tub frame, and the infant tub, in accordance with the disclosure herein.
Figure 27:
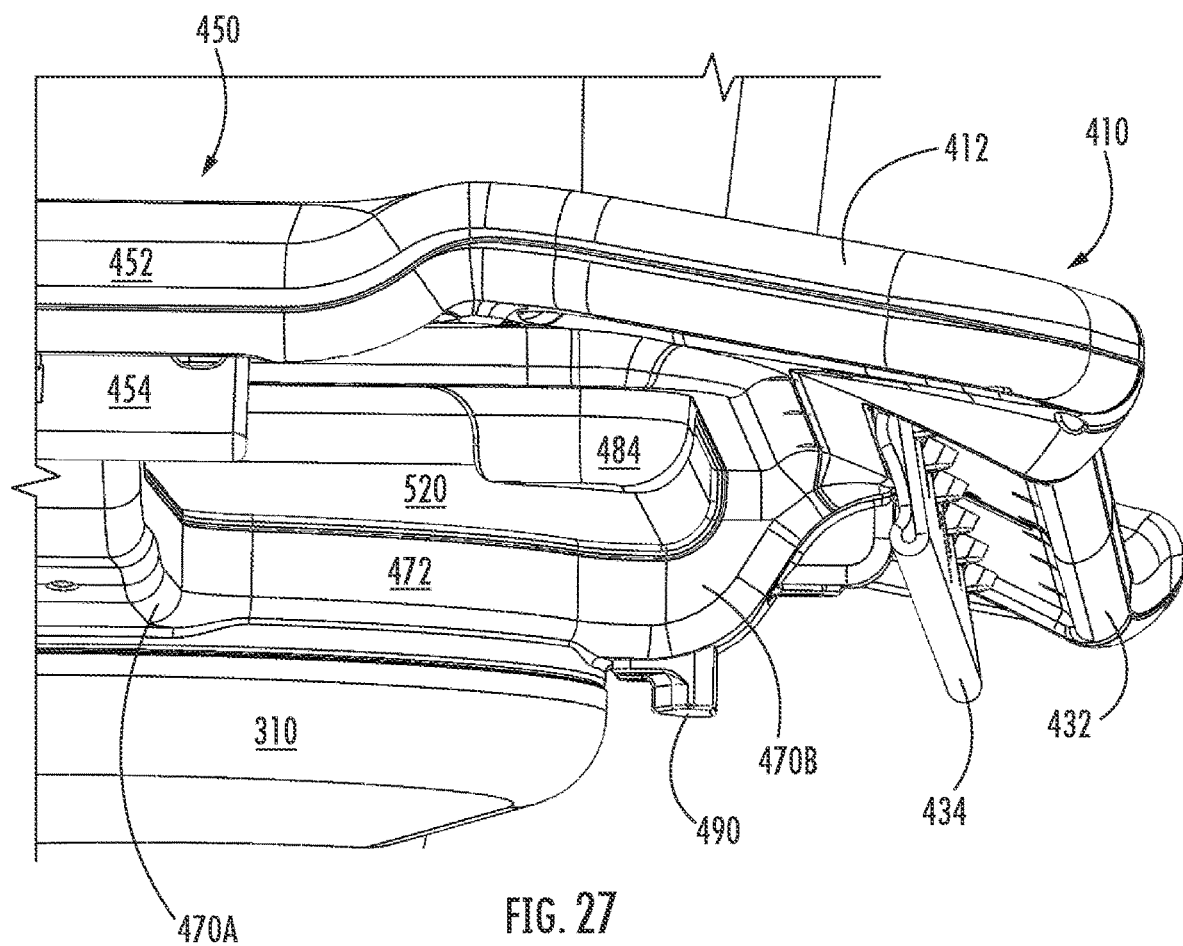
FIG. 27 is a partial view of the tub frame of the bassinet shown in FIG. 1, in accordance with the disclosure herein.
Figure 28:
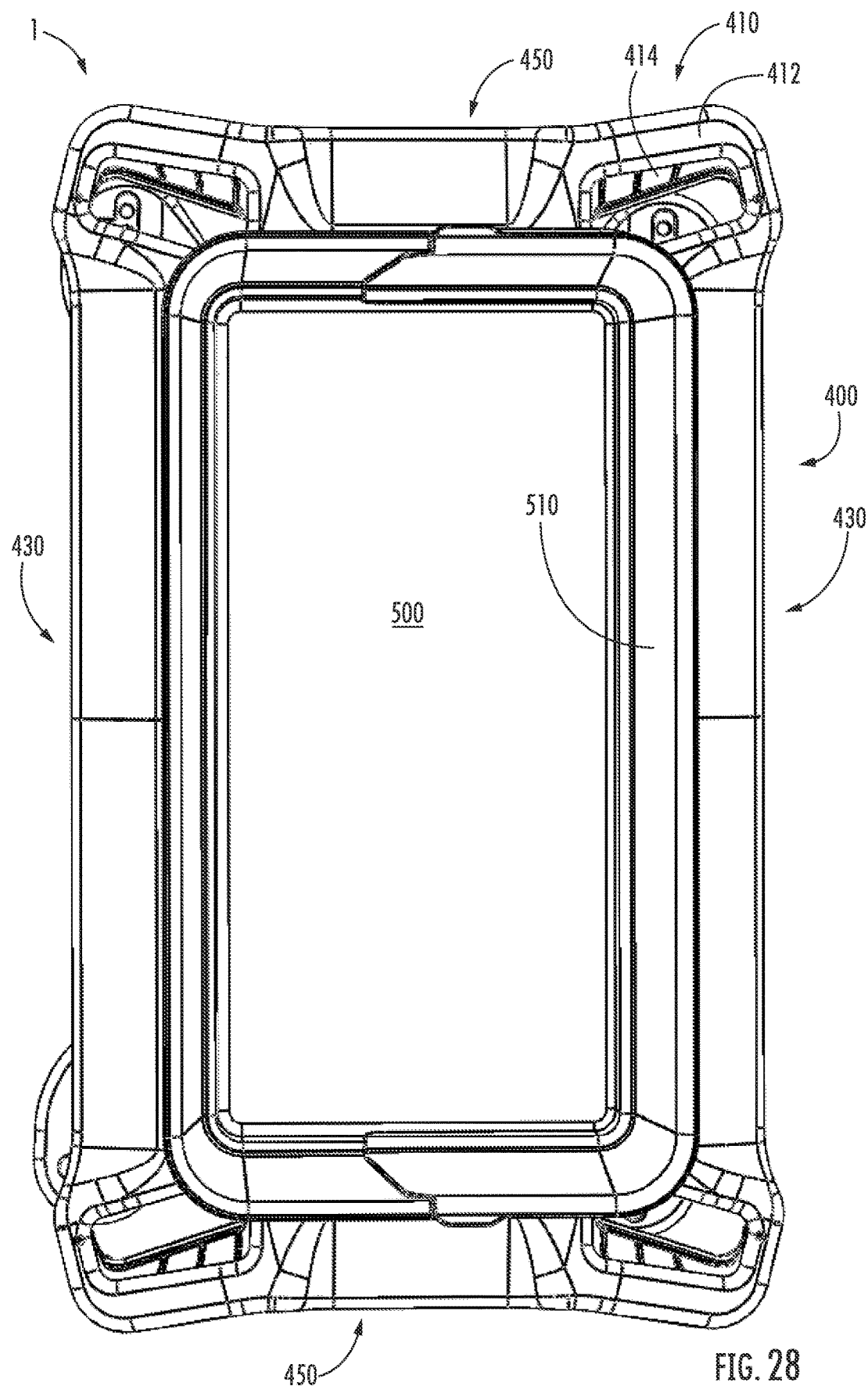
FIG. 28 is a top view of the bassinet shown in FIG. 1, in accordance with the disclosure herein.
Figure 29:
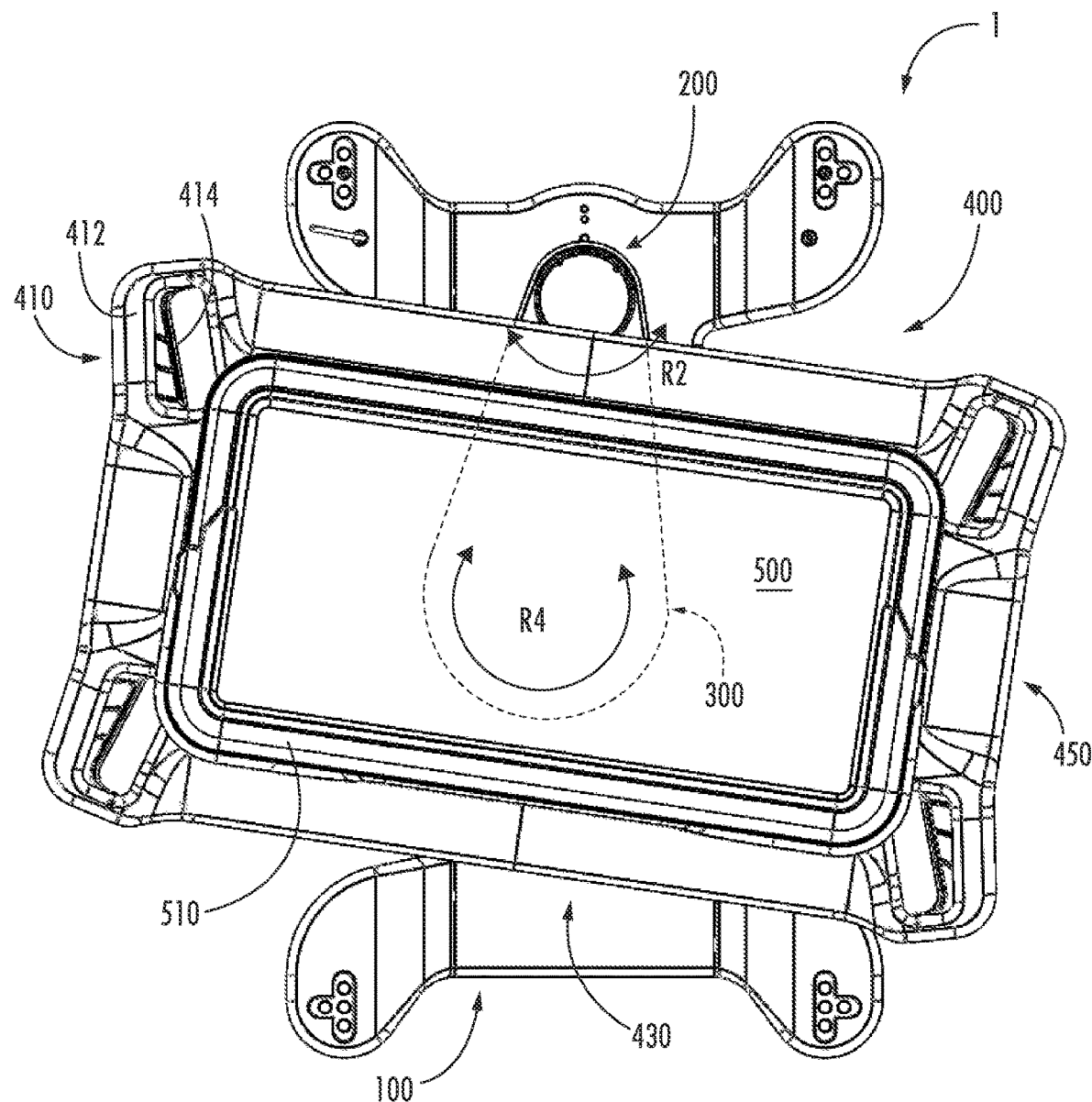
FIG. 29 is a top view of the bassinet shown in FIG. 1, with the rotary arm rotated relative to the base and the tub frame rotated relative to the rotary arm, in accordance with the disclosure herein.
Figure 30A:
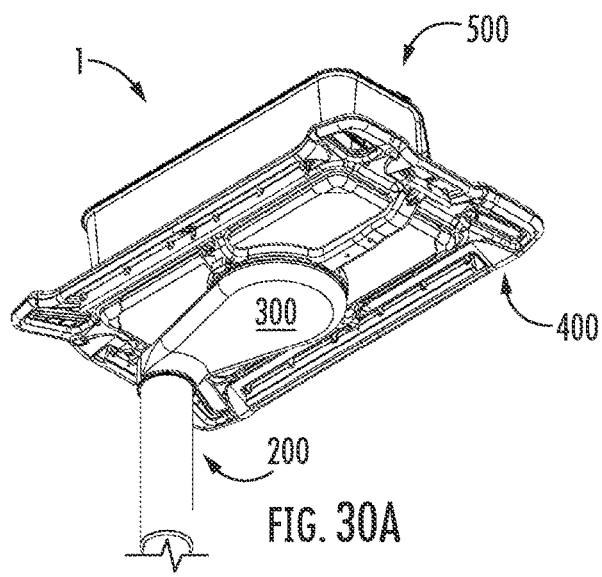
FIGS. 30A-30D are isometric views showing the tub frame of the bassinet shown in FIG. 1 in various rotatable positions relative to the rotary arm, in accordance with the disclosure herein.
Figure 30B:
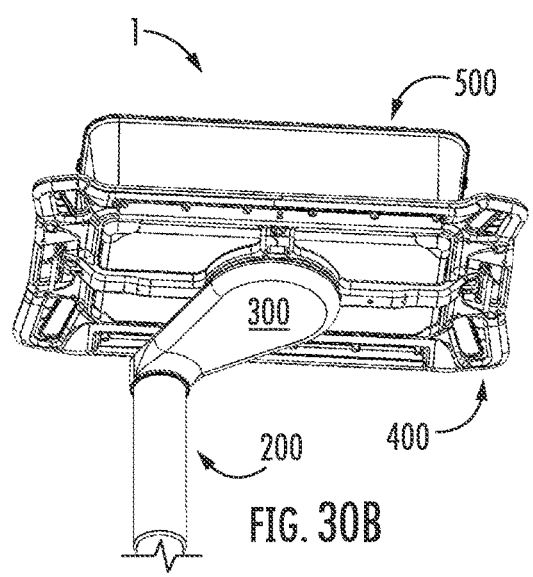
Figure 30C:
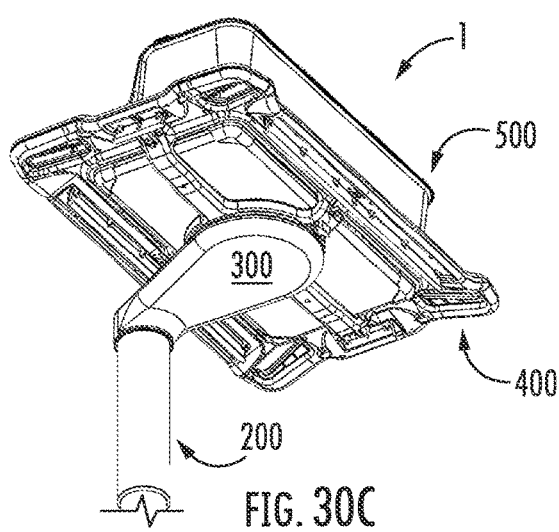
Figure 30D:
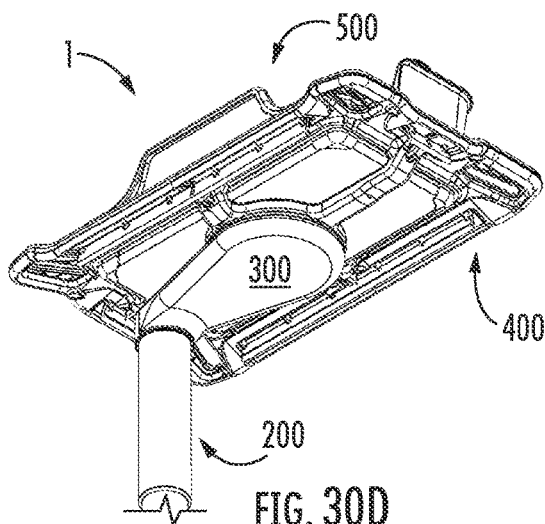
Figure 31:
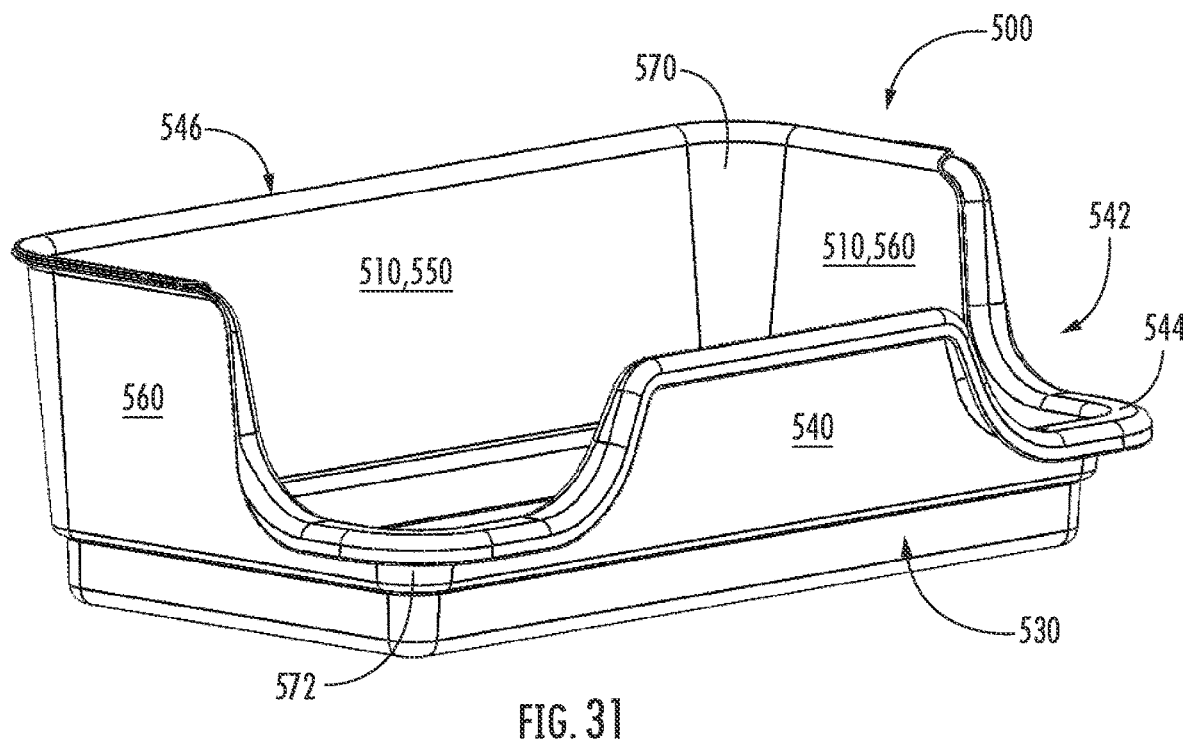
FIG. 31 is an isometric view of the infant tub of the bassinet of FIG. 1, in accordance with the disclosure herein.
Figure 32:
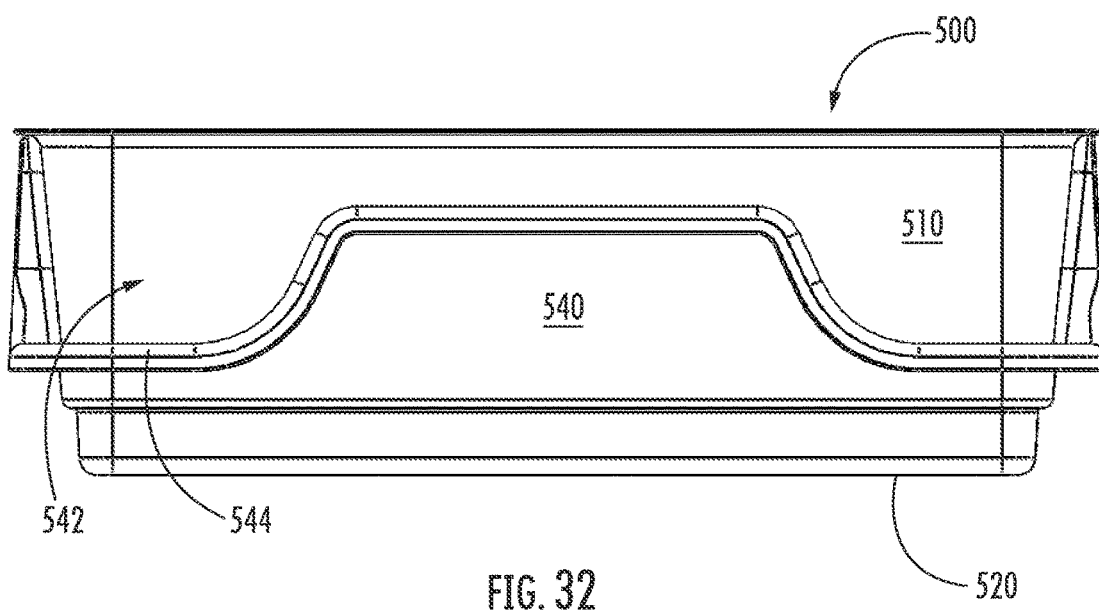
FIG. 32 is a side view of the infant tub of the bassinet of FIG. 1, in accordance with the disclosure herein.
Figure 33:
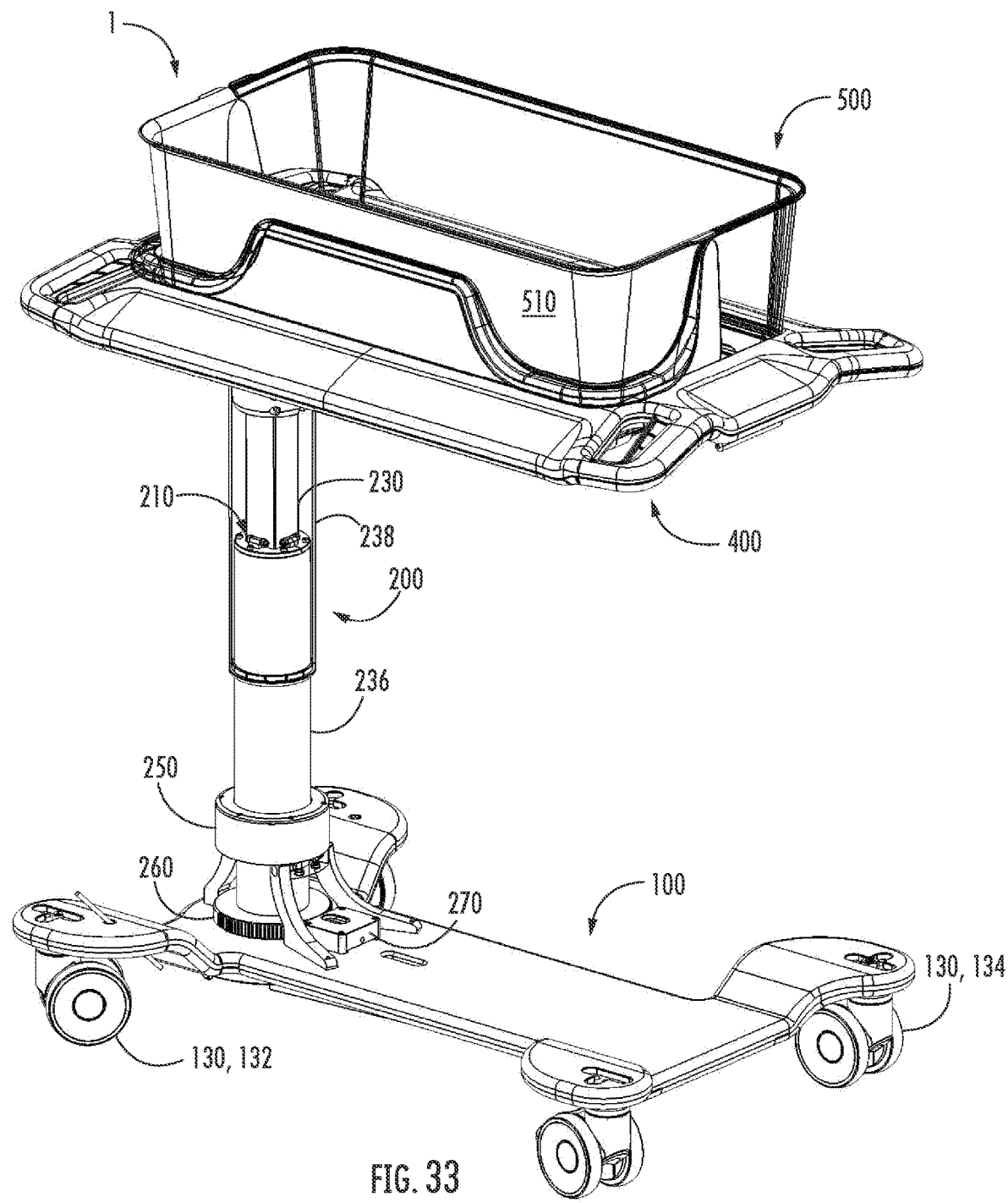
FIG. 33 is an isometric view of the bassinet shown in FIG. 1, in accordance with the disclosure herein.
Figure 34:
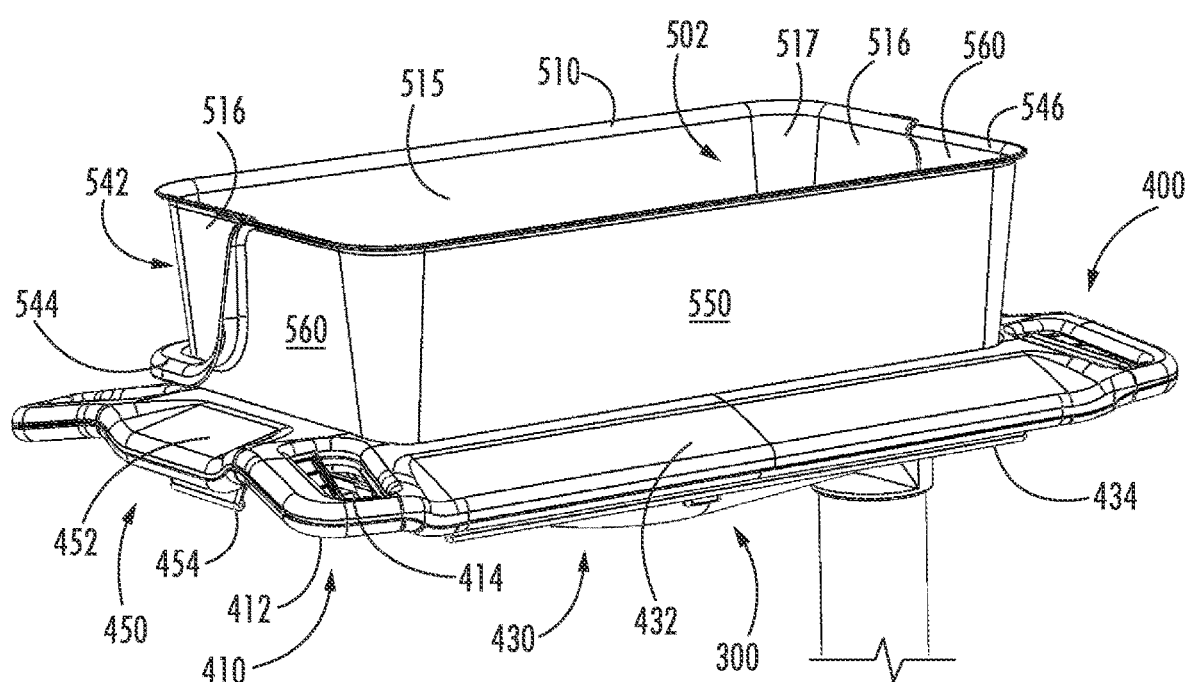
FIG. 34 is a partial view of the bassinet shown in FIG. 1, in accordance with the disclosure herein.

The rotational movements of the column assembly 200, arm 300, and tub frame 400 relative to the base 100 are shown in FIG. 23, with the direction of rotation being indicated by R2. Infant tub 500 rotates along with tub frame 400 when placed therein. FIGS. 24A-24E show example angular movements of the column assembly 200 and the arm 300 relative to base 100. FIGS. 25-28 show other views of the bassinet 1 to more clearly illustrate the features thereof. Specifically, the tub frame 400 has a corner brace 484 at each corner thereof to support the infant tub 500 when placed therein. Infant tub 500 is also supported by the upper surface of hub 472 and lateral ribs 470A, 470B, thereby defining a substantially flat plane along which the bottom surface 520 of the infant tub 500 is supported by the tub frame 400. In the embodiment shown, the range of motion of the tub frame 400 relative to the arm 300 is controlled by rotary stop 490, the position of which on tub frame 400 determines the maximum angular degree of rotation of the tub frame 400 relative to the arm 300 by the rotary stop 490 contacting the arm 300 when the maximum angular rotation in one direction (e.g., clockwise or counterclockwise) is reached, thereby preventing rotational movements of the tub frame 400 that would result in damage to the respective actuation cables contained within and routed throughout the tub frame 400. The pivoting movements of the tub frame 400 and the infant tub 500 relative to the arm 300 are shown in FIG. 29, with the direction of rotation being indicated by R4. Infant tub 500 pivots along with tub frame 400 when placed therein. FIGS. 30A-30D show example angular pivoting movements of the tub frame 400 and the infant tub 500 relative to the arm 300.

Some features of the infant tub are shown and described relative to FIGS. 31-36B. Infant tub 500 can be made from one or more of opaque, translucent, and/or transparent materials, including, for example, aluminum, plastic, or any other suitable material. The infant tub has a recessed portion, generally designated 530, which has a reduced length and/or width compared with the perimeter of the infant tub 500 measured at a height above the recessed portion 530. Recessed portion 530 is provided to more accurately retain the infant tub 500 within the tub frame 400 and also to conform to a standard mattress (see, e.g., 700, FIG. 41) or pad shape that would be placed within the recessed portion 530 inside the infant tub 500. In some embodiments, physical indentations and/or protuberances in the tub frame 400 and the infant tub 500, detachable mating clips attached thereto, and the like may be provided to provide enhanced physically interlocking engagement between the tub frame 400 and the infant tub 500. In some embodiments, an actuatable release may be provided within the tub frame 400 to prevent the infant tub 500 from being separated from the tub frame 400 without the release being disengaged, either by direct manipulation of the release or by a remote release, for example, of the type shown for any of the wheel handles 410, the pivot/rotation handles 430, and/or the height handles 450. The mattress 700 or pad can, for example, have a height that is substantially the same as the height of the recessed portion 530 to provide an effectively flat bottom surface of the infant tub 500 that is larger than bottom surface 520 of the infant tub 500. The infant tub has, above the recessed portion 530, opposing lateral side walls 560 that are connected by a front wall 540 and a back wall 550. Side walls 560 and back wall 550 have a height that meets all applicable safety standards necessary for the transport of infants within a mobile bassinet. Front wall 540 has a reduced height that provides increased access to infants within the infant bassinet. In the corners 572 joining the front wall 540 with the side walls 560, a further reduced height section 542 is provided to allow for a mother or other caregiver to have easier access to the infant to ensure the infant in safely transitioned from the bassinet into the arms of the mother or other caregiver. The upper edges of the back wall 550 and the side walls 560 have a rolled edge to provide a more distributed point of contact between the arms of the mother or other caregiver and the infant tub 500 when placing the infant into or removing the infant from the infant tub 500. At each of corners 572, along the entirety of the reduced height section 542, and along the upper edge of front wall 540, a fully rolled edge is provided to ensure a maximized distributed point of contact between the arms of the mother or other caregiver and the infant tub 500 when placing the infant into or removing the infant from the infant tub 500.

Infant tub 500 has an insert 510 that is contoured to the back wall 550 and the full height portions of the side walls 560, including conforming to the inner contours of the recessed portion 530 and extending proximate to (e.g., in contact with) the bottom surface 520 of the infant tub 500. As such, when a mattress (e.g., 700, FIG. 41) is placed within the recessed portion 530, the insert 510 is held securely against the back wall 550 and the side walls 560 to provide increased access to the infant when needed. During periods when increased access to the infant is not needed (e.g., during sleep and/or transport of the infant), the insert 510 is configured to be reversibly installed into a first position (see FIGS. 34-36A), such that the insert 510 is in contact with the front wall 540 and the side walls 560 of the infant tub 500. In the second position (see FIGS. 31 and 32), the insert 510 is located against the side walls 560 and the back wall 550 of the infant tub 500, so as to not require a separate storage location for the insert 510 when enhanced access to the interior of the infant tub 500 is desired by a user. The full height portions of the side walls 560 extend at least half of the total width of the overall width of the infant tub 500. The sides of the insert 510 extend, just as with the side walls 560 of the infant tub 500, over half of the width of the infant tub 500. As such, when in the first position, the insert fully overlaps the reduced height sections 542 and the front wall 540, thereby providing a substantially wall of a single height to prevent infants from rolling or otherwise falling over the side of the infant tub 500 while, for example, sleeping or being transported within the infant tub 500.

Figure 35:
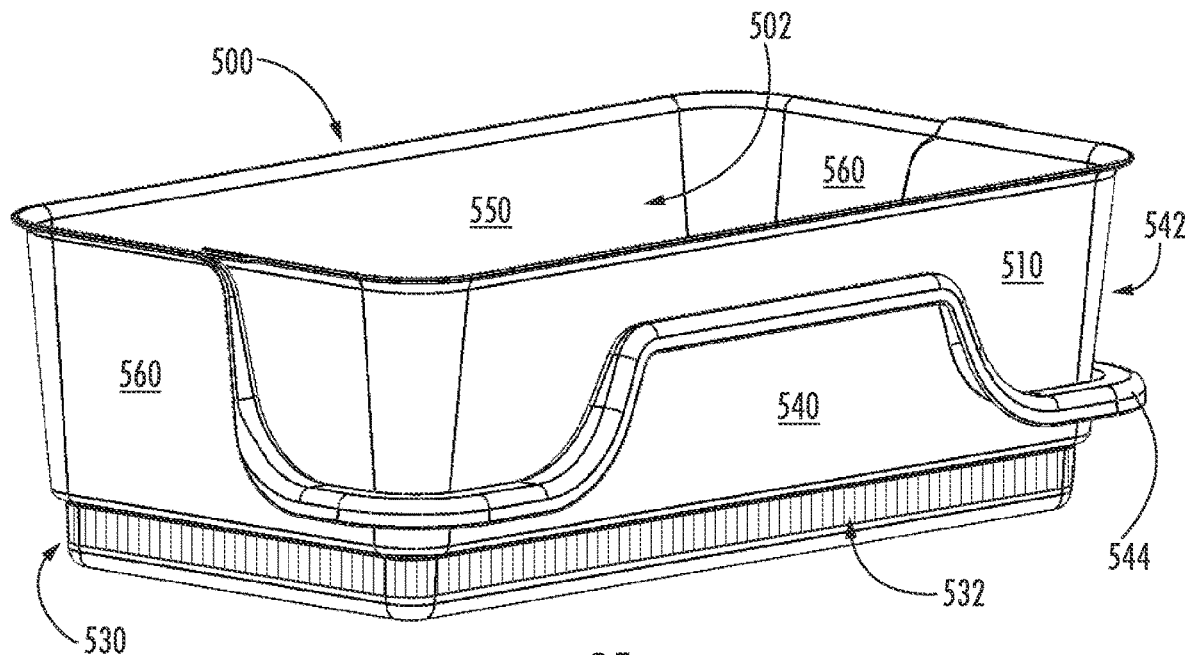
FIG. 35 is an isometric view of the infant tub of the bassinet of FIG. 1 with an insert positioned therein, in accordance with the disclosure herein.
Figure 36A:
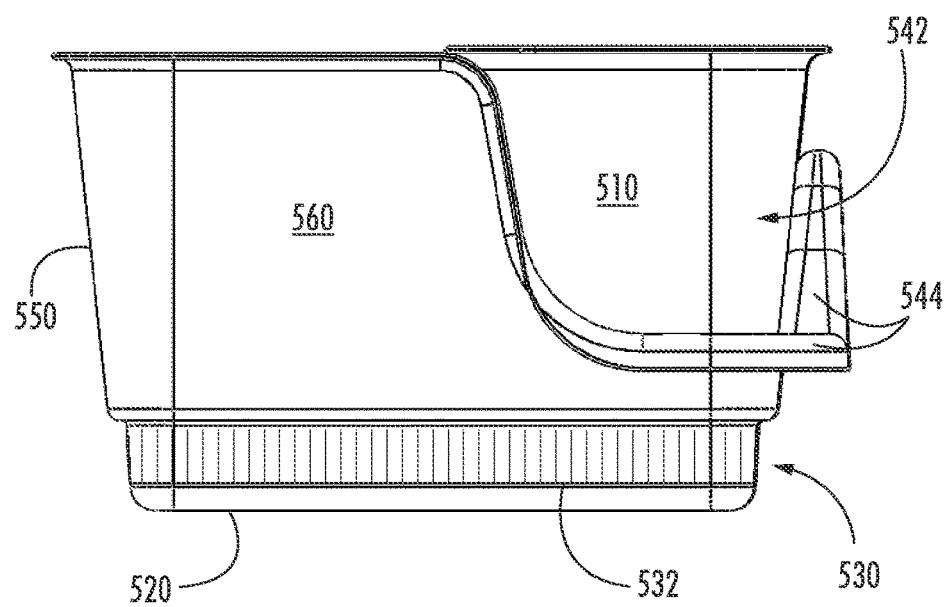
FIG. 36A is a front view of the infant tub of the bassinet of FIG. 1 with an insert positioned therein, in accordance with the disclosure herein.
Figure 36B:
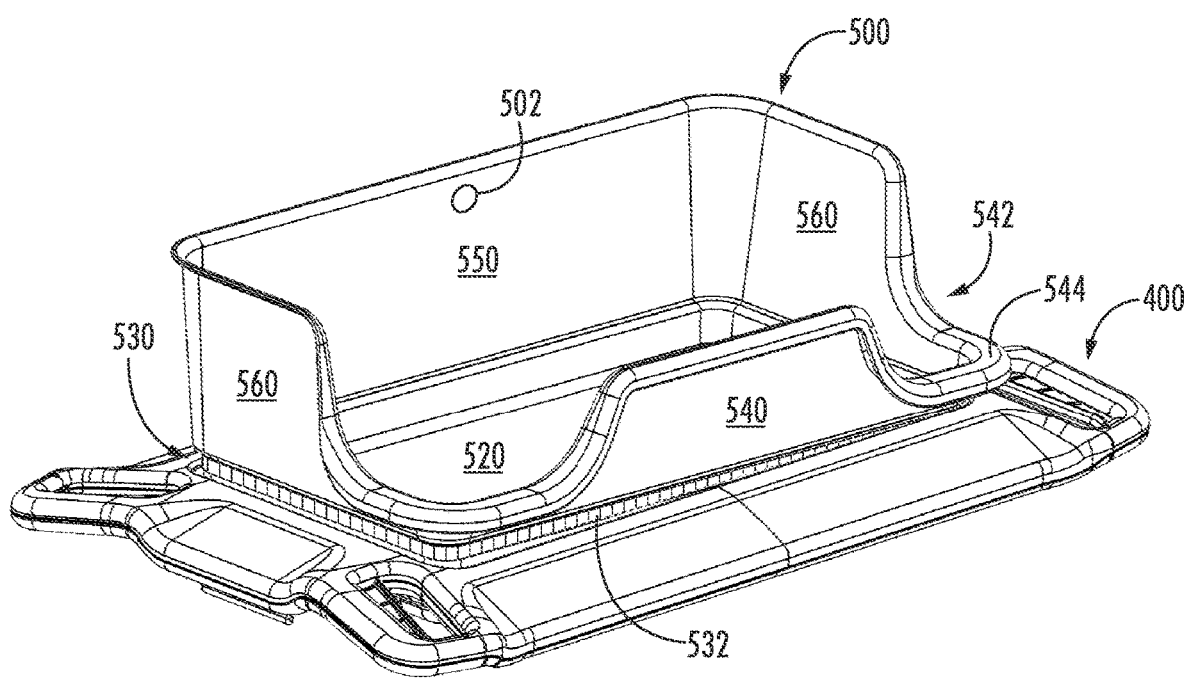
FIG. 36B is an isometric view of the infant tub of the bassinet of FIG. 1 in an incompletely seated position with respect to the tub frame, such that a visual indicator is visible to warn a user of incomplete or improper infant tub positioning within the tub frame, in accordance with the disclosure herein.

In some embodiments, the infant tub 500 has a visual indicator 532, which is shown in an example embodiment in FIGS. 35, 36A, and 36B as a vividly colored area, such as red in the embodiment shown in FIGS. 35, 36A, and 36B within the recessed portion 530 to provide a visual indication to a user when the infant tub 500 is not fully engaged within the tub frame 400. An example of such a misalignment, incomplete, and/or improper insertion of the infant tub 500 within the tub frame 400 can be seen, for example, in FIG. 36B, which shows an example of the infant tub 500 not being fully and/or properly seated/positioned within the tub frame 400. Further safety indicia may be provided to be visible on one or more of the outside and/or the inside surfaces of the infant tub 500. Such safety indicia may include printed materials directing proper use of the bassinet 1 and warning of the dangers posed by improper use, such as, for example, placing an infant face down within the infant tub 500. As noted above, the infant tub 500 may include, in some embodiments, a visual indicator 532 around the bottom perimeter of the infant tub 500 (e.g., within the recessed portion 530). In the embodiment shown, this visual indicator 532 is flush with the infant tub 500, is approximately one inch in width, and, from the outside of the tub, the visual indicator 532 is only visible when the infant tub 500 is incorrectly positioned in the tub frame 400. This visual indicator 532 serves as a visual cue to appropriately adjust the infant tub 500 into the intended secure position within the tub frame 400. In the embodiment shown, the outside marking may be red or some other vivid and/or noticeable color to draw attention and action from users regarding the m is-alignment, incomplete, and/or improper positioning of the infant tub 500. In embodiments where the infant tub 500 is made of, at least in part, a translucent and/or a transparent material, the visual indicator 532 can serve as a pre-populated message board, with basic patient care information integrated on the inner surface thereof (e.g., the surface engaged against the outer surface of the infant tub 500), such as "position infant on his/her back to sleep." The inside marking of visual indicator 532 may be a neutral color, such as white.

Figure 37:
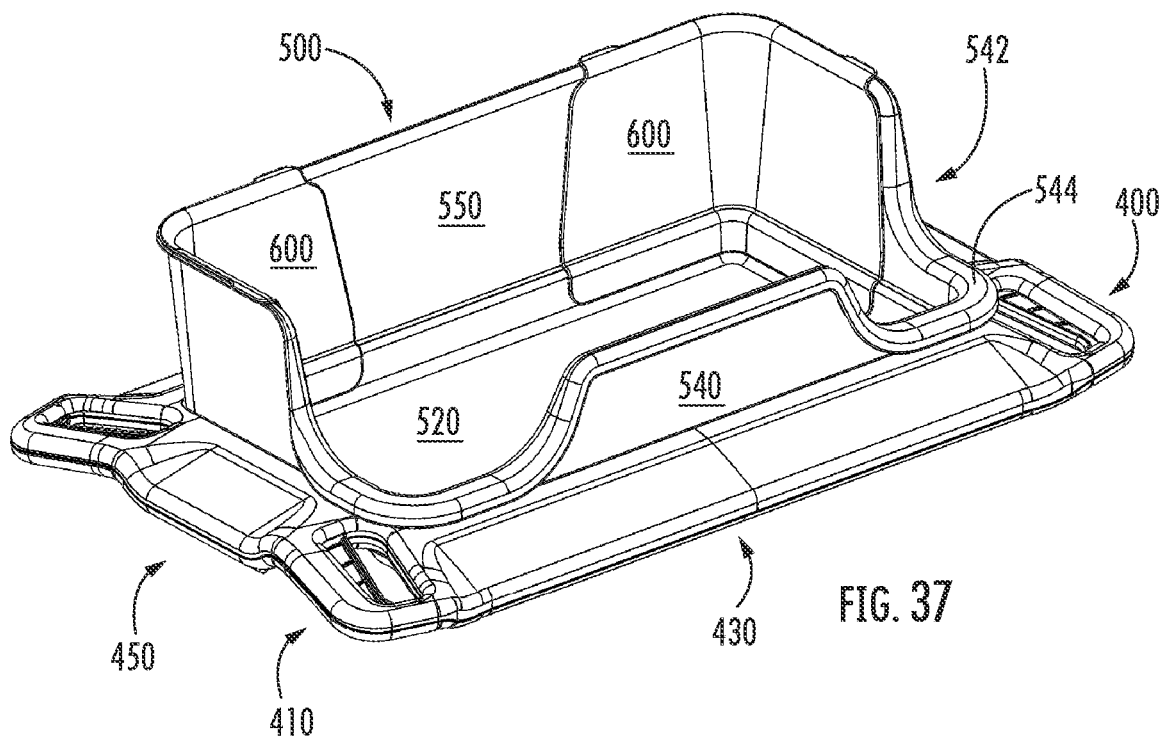
FIGS. 37-40 are isometric views of the infant tub and tub frame of the bassinet of FIG. 1, with a further example embodiment of a two-piece insert shown in first and second positions, in accordance with the disclosure herein.
Figure 38:
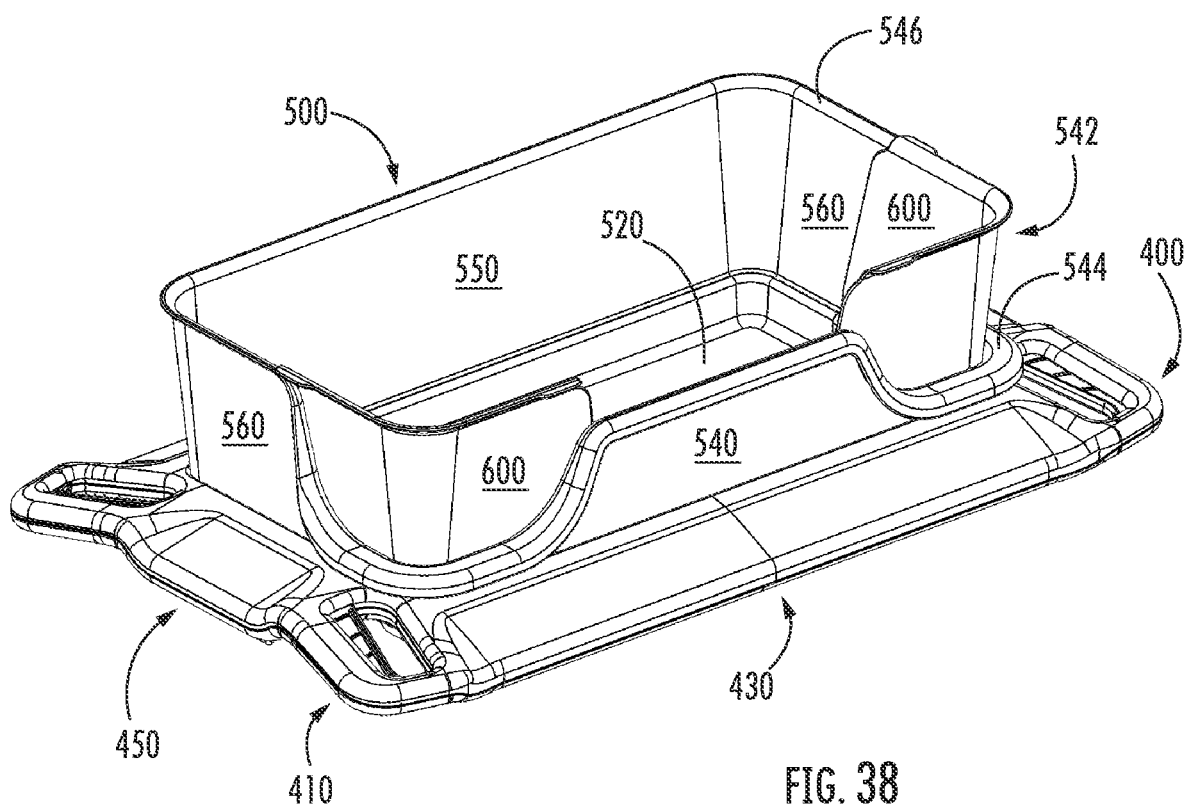
Figure 39:
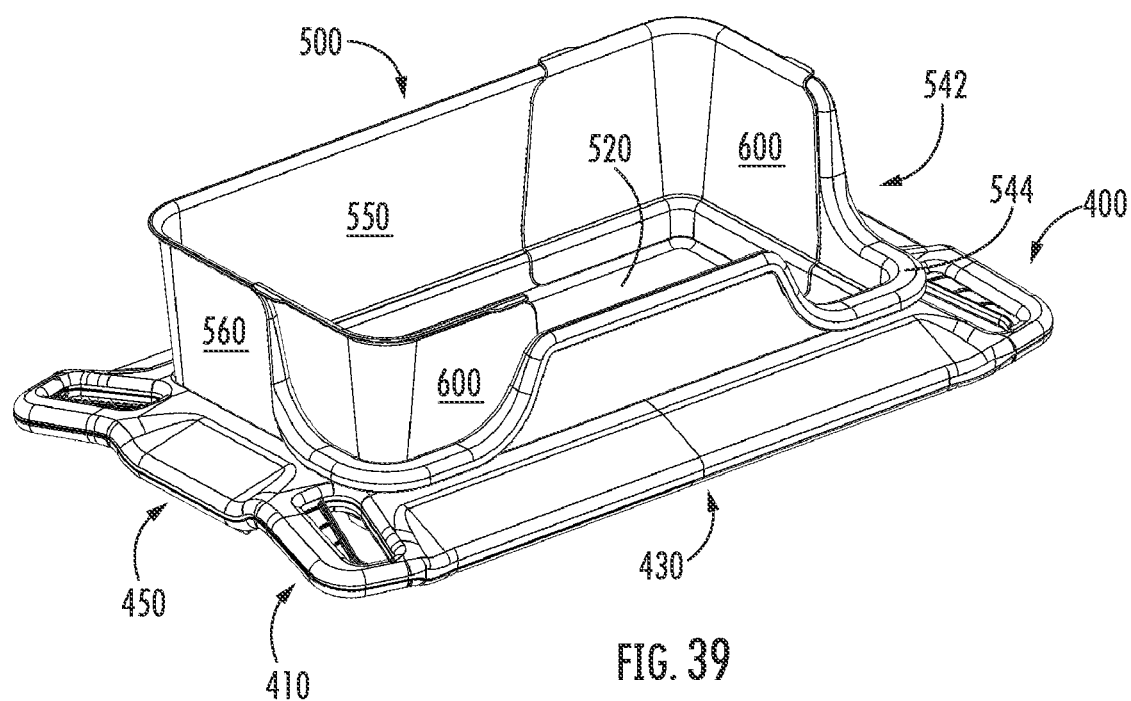
Figure 40:
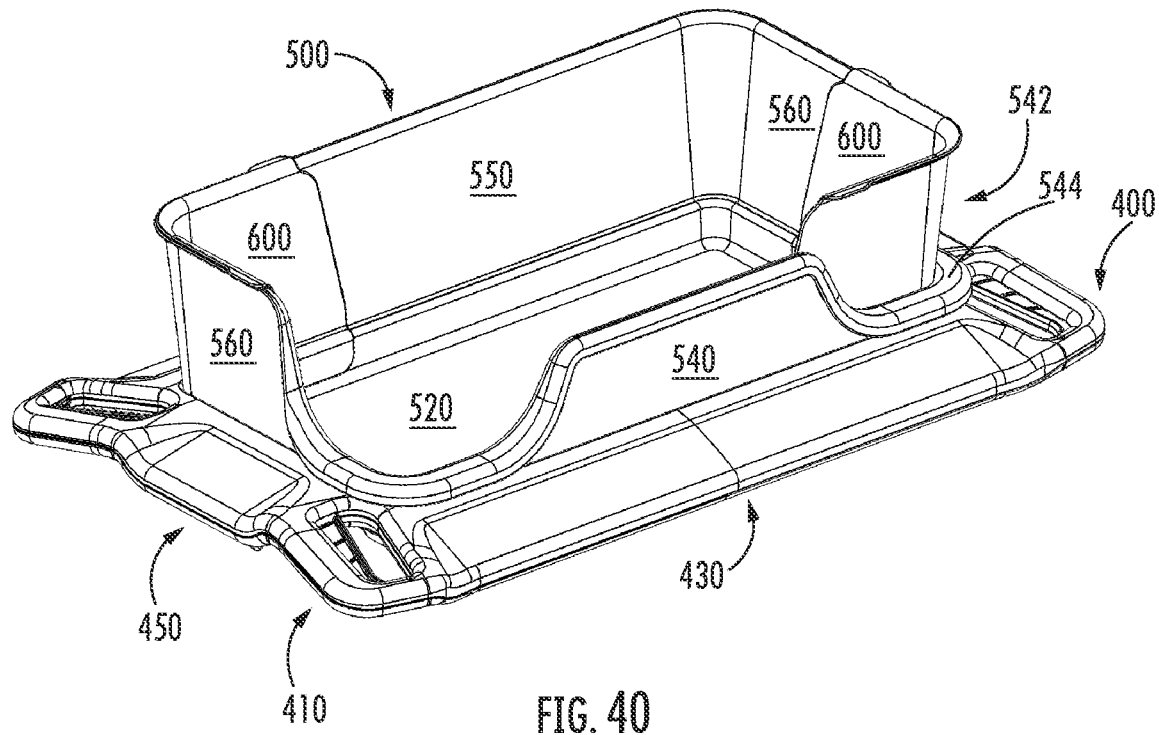
Figure 41:
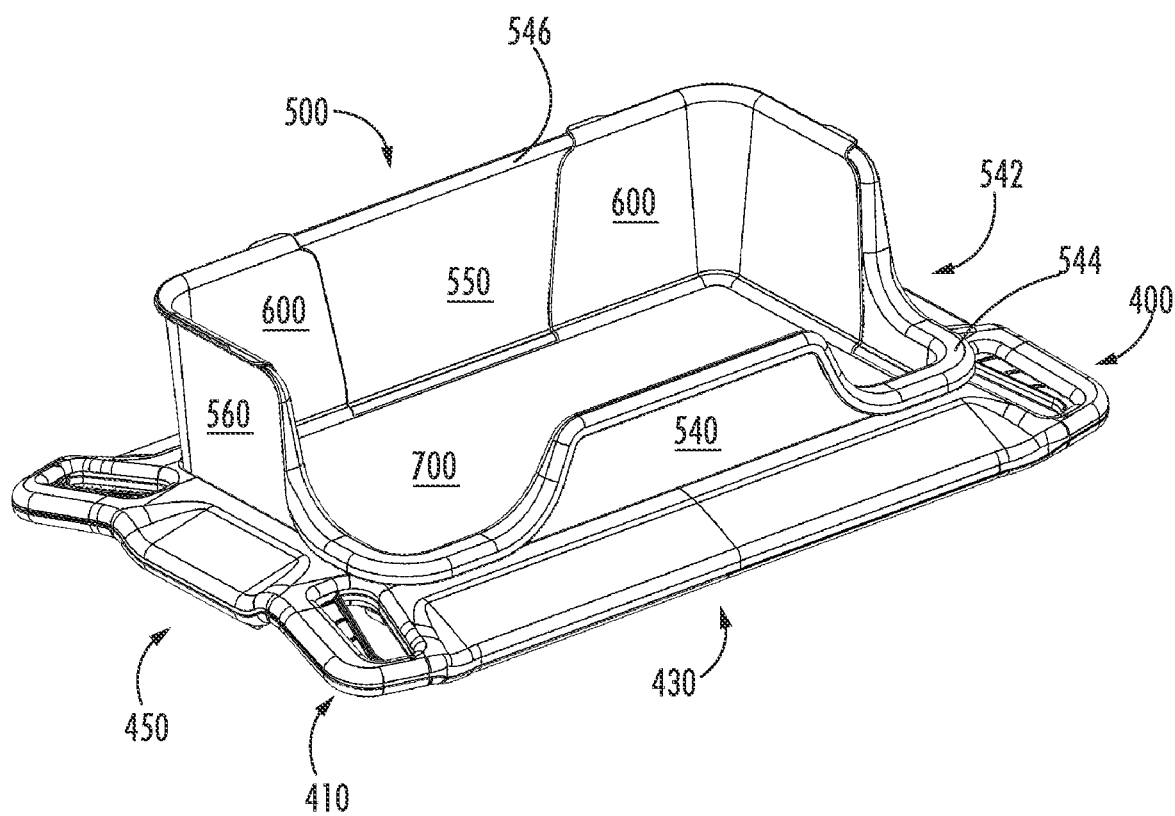
FIG. 41 is an isometric view of the infant tub of and tub frame of FIG. 37, showing a mattress positioned within the infant tub to secure the insert within the infant tub, in accordance with the disclosure herein.

FIGS. 37-41 show an example embodiment of a two-piece insert, generally designated 600, installed in various installation positions within an infant bassinet 500. The inserts 600 have contoured shapes that match the internal contours of the rear wall 550 and side wall 560 of at least one of the corners of the infant tub 500. In FIG. 37, the inserts 600 are in a second position, in which the reduced height sections 542 are not blocked and each of the inserts 600 are positioned adjacent to (e.g., substantially flush with) the back wall and at least a portion of one of the two side walls of the infant tub 500. In some embodiments, the inserts 600 can be configured to be installed in any of the corners of the infant tub, including at the reduced height sections 542 of infant tub 500. In other embodiments, the inserts 600 can be configured to be "keyed" or otherwise shaped to only fit within a pair of designated corners of the infant tub 500. Regardless of the configuration of the inserts 600 and in which corners of the infant tub 500 they are configured to fit, the height of the perimeter of the infant tub is not a continuous height but is instead a reduced height along at least a portion of front wall 540 where inserts 600 do not overlap front wall 540 (see, e.g., FIGS. 38-40) when both inserts 600 are in the second position. FIG. 38 shows the inserts 600 installed in a first position, in which the inserts 600 block the reduced height sections so that an upper edge 546 of the infant tub 500 and the inserts 600 is substantially continuous, other than at a portion of the front wall 540 over which the inserts 600 do not overlap. FIGS. 39 and 40 show two example configurations for the inserts 600 within the infant base, with one insert 600 being installed in the first position and one insert 600 being installed in the second position in each of FIGS. 39 and 40. FIG. 41 shows the inserts 600 being retained in the second position by being positioned between a mattress 700 located within the recessed portion (see 530, FIGS. 31 and 32) of the infant tub 500 and the walls of the recessed portion itself.

Figure 42:
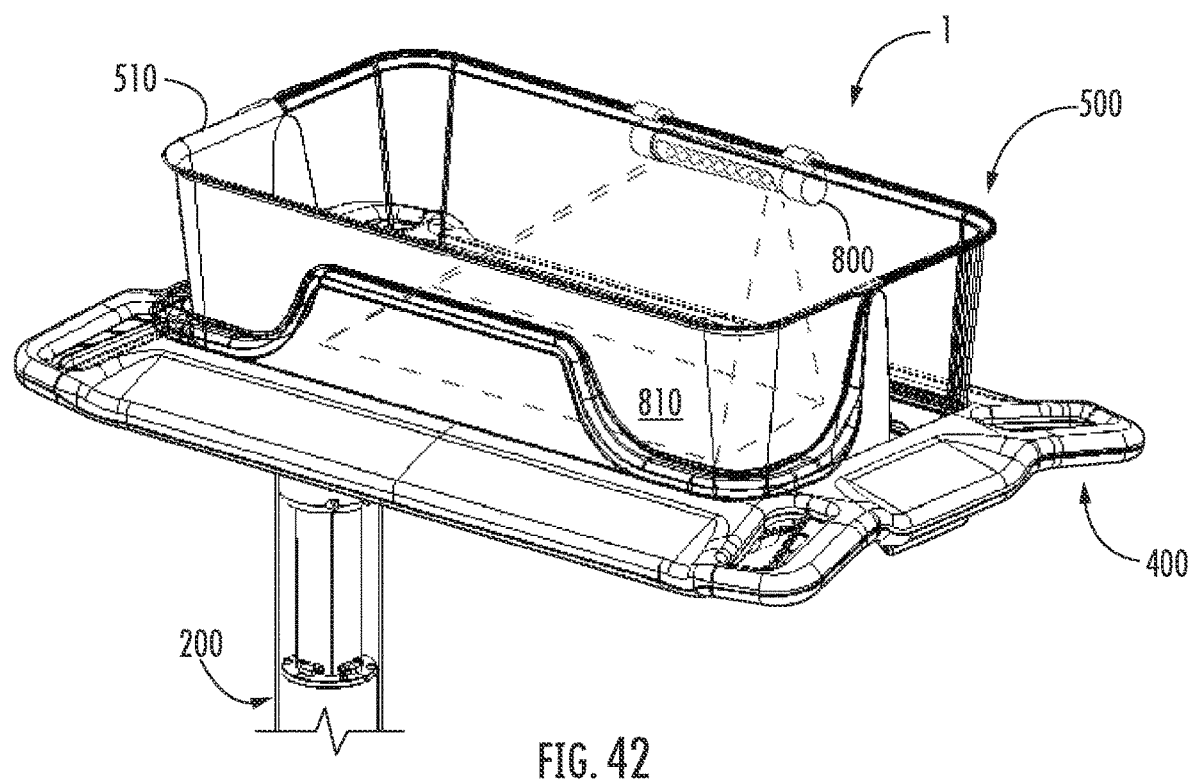
FIGS. 42 and 43 are isometric views of the bassinet of FIG. 1 according to an embodiment having a lighting device attached to the bassinet, in accordance with the disclosure herein.
Figure 43:
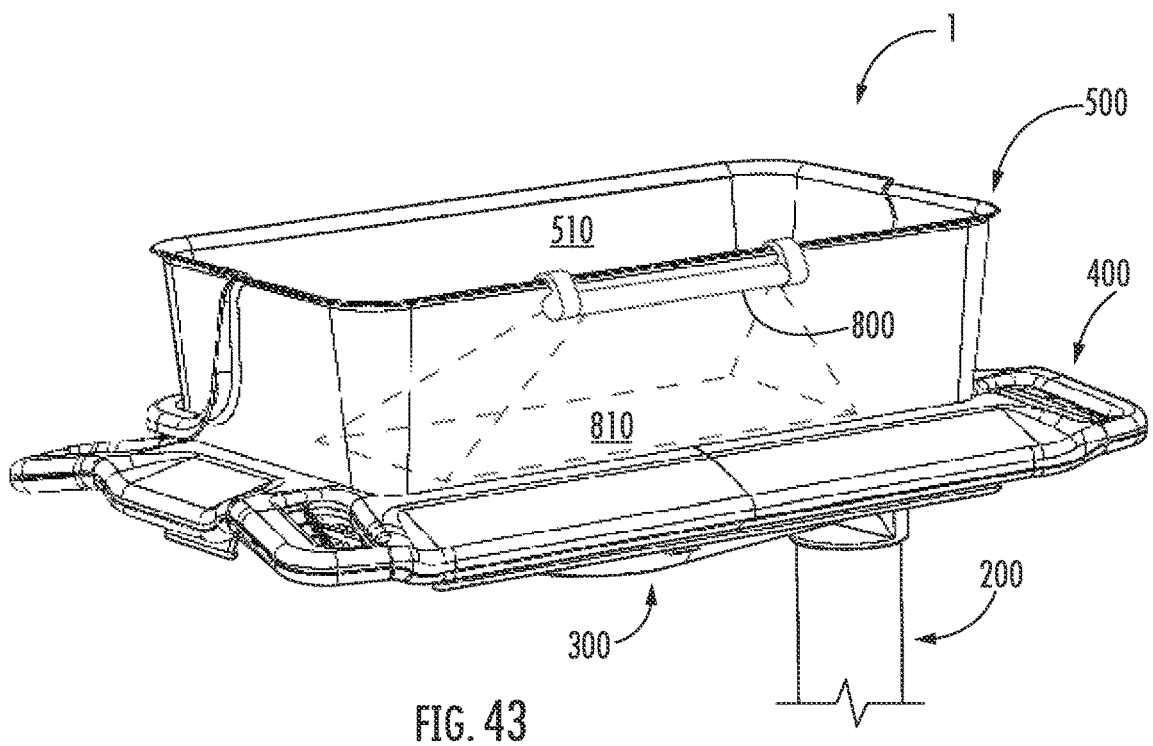

In some embodiments, as shown in the example embodiment of FIGS. 42 and 43, a lighting device 800 (see also, 502, FIG. 36B) or devices can be included in association with bassinet 1. For example, one or more LEDs or other suitable lighting device(s) can be provided in, on, integrally formed within, or removably coupled to the infant tub 500. In some embodiments, the lighting device(s) 800 can be similarly incorporated with, or attached to, the tub frame 400, either instead of, or in addition to, the lighting device 800 on the infant tub 500. The lighting device(s) 800 can be provided power via batteries contained within a receptacle within the infant tub 500 or via electrical contacts on the infant tub 500 that mate with corresponding electrical contacts on the tub frame 400 to provide power to the lighting device(s) 800 from a power source (e.g., a rechargeable battery) located elsewhere on the bassinet 1 (e.g., on the base 100, on the arm 300, or on the tub frame 400). The lighting device(s) 800 can in an example embodiment be positioned above the infant positioned within the infant tub 500 to provide optional lighting when activated within the infant tub to promote safe and comfortable infant handling by a user during periods of darkness, such as at night. The intensity of the light generated by the lighting device 800 may be controlled by a user, for example, by turning an intensity knob or engaging/pressing one or more buttons configured to set the lighting device at one of a plurality of preset illumination intensity thresholds, so that the infant's sleeping is not disturbed by turning on the lighting device 800. In some embodiments, the lighting device 800 may be configured to direct the light generated toward a center region 810 of the infant tub 500, away from an area of the infant tub in which the infant's face would be located while sleeping in the infant tub.

The embodiments described herein are examples only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims.

What is claimed is:

1. A method, comprising:
transitioning, by a user while the user is in a seated position, an infant tub from at least one of a first position or first orientation to at least one of a second position or second orientation by engaging with at least one of the infant tub or a tub frame supporting the infant tub to cause the infant tub to rotate and/or translate relative to a base such that a front wall portion of the infant tub is facing the user and disposed sufficiently close to the user such that the user can access an interior of the infant tub from the seated position, the infant tub coupled to the base via a column assembly and an arm rotatably coupled to the column assembly; and accessing, by the user while the user is in the seated position, an infant disposed within the interior of the infant tub by inserting a first arm of the user through a first opening defined above a first reduced height portion of the infant tub and a second arm of the user through a second opening defined above a second reduced height portion of the infant tub such that the user is in contact with the infant through the first opening and the second opening, the first opening and the second opening separated by the front wall portion, the front wall portion having a greater height relative to a bottom portion of the infant tub than the first reduced height portion and the second reduced height portion.

2. The method of claim 1, wherein the transitioning is performed by the user without assistance from another person.

3. The method of claim 1, comprising removing, by the user while the user is in the seated position, the infant from the interior of the infant tub via removing the first arm from the first opening, removing the second arm from the second opening, and lifting the infant over the front wall portion.

4. The method of claim 1, wherein the user is in the seated position on a bed.

5. The method of claim 1, comprising transitioning, prior to the accessing, a blocking portion from a first configuration in which the blocking portion blocks the first opening to a second configuration in which the blocking portion does not block the first opening.

6. The method of claim 1, wherein, in the second position or second orientation, the infant tub is at least partially disposed above and vertically aligned with a portion of the user.

7. The method of claim 1, comprising adjusting, by the user, a height of the infant tub relative to the base by hand actuating a height handle included in the tub frame and operatively coupled to a height adjustment actuator included in the column assembly, the height handle disposed higher than a surface on which the user is seated during the adjusting.

8. The method of claim 1, comprising:

deactivating, by the user while the user is in the seated position, an automatic lock feature associated with a wheel coupled to the base via hand actuating a wheel handle included in the tub frame and operatively coupled to the automatic lock feature, the wheel handle disposed higher than a surface on which the user is seated during the deactivating; and moving the base via pulling on at least one of the infant tub or the tub frame.

9. The method of claim 1, wherein the transitioning includes engaging, by a hand of the user, a pivot handle included in the tub frame and operatively coupled to a pivot actuator included in the tub frame, the pivot handle disposed higher than a surface on which the user is seated during the adjusting.

* * * * *